(12) United States Patent
Goodspeed et al.

(10) Patent No.: US 9,471,547 B1
(45) Date of Patent: *Oct. 18, 2016

(54) NAVIGATING SUPPLEMENTAL INFORMATION FOR A DIGITAL WORK

(75) Inventors: Joshua M. Goodspeed, Seattle, WA (US); Janna Hamaker, Issaquah, WA (US); Adam J. Iser, Mercer Island, WA (US); Peter Thomas Killalea, Seattle, WA (US); Abhishek Patnia, Seattle, WA (US); Alla Taborisskaya, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,798

(22) Filed: Sep. 27, 2011

Related U.S. Application Data

(60) Provisional application No. 61/538,715, filed on Sep. 23, 2011.

(51) Int. Cl.
*G06F 17/00* (2006.01)
*G06F 17/21* (2006.01)
(Continued)

(52) U.S. Cl.
CPC .............. *G06F 17/21* (2013.01); *G06F 3/0481* (2013.01); *G06F 3/0482* (2013.01);
(Continued)

(58) Field of Classification Search
CPC ........... G06F 17/30873; G06F 3/0481; G06F 17/272; G06F 17/21; G06F 17/211; G06F 17/241; G06F 3/0483; G06F 3/0482; G06Q 30/02

USPC ............... 715/716, 208, 864, 767, 776, 802, 715/804–805, 817, 851, 273; 705/10
See application file for complete search history.

(56) References Cited

U.S. PATENT DOCUMENTS

D146,109 S   12/1946  Jones
5,251,125 A  10/1993  Karnowski et al.
(Continued)

FOREIGN PATENT DOCUMENTS

CN   101309323   11/2008
JP   2002508543  3/2002
(Continued)

OTHER PUBLICATIONS

The Canadian Office Action mailed Dec. 12, 2011 for Canadian design application No. 142736, a counterpart foreign application of Design U.S. Appl. No. 29/402,813, 1 page.
(Continued)

*Primary Examiner* — Quoc A Tran
(74) *Attorney, Agent, or Firm* — Lee & Hayes, PLLC

(57) ABSTRACT

In some implementations, a digital work may include a plurality of objects that may be selected to view supplemental information. A supplemental information user interface may include a listing of objects from the digital work. For instance, the listing may include a selected object appearing at an identified location in the digital work. The user interface may further present a visual representation displayed with each object that provides an indication of at least one location of at least one occurrence of the corresponding object in the digital work. In some examples, a user may navigate between a supplemental information view user interface, a page view user interface, a chapter view user interface, a book view user interface, a series view user interface, and/or a library view user interface to view occurrences of a particular object in the digital work or other digital works.

29 Claims, 21 Drawing Sheets

(51) Int. Cl.

| | | |
|---|---|---|
| G06F 17/27 | (2006.01) | |
| G06F 3/0481 | (2013.01) | |
| G06F 17/24 | (2006.01) | |
| G06F 3/0483 | (2013.01) | |
| G06F 17/30 | (2006.01) | |
| G06F 3/0488 | (2013.01) | |
| G06F 3/0482 | (2013.01) | |
| G06Q 30/02 | (2012.01) | |

(52) U.S. Cl.
CPC .......... *G06F 3/0483* (2013.01); *G06F 3/0488* (2013.01); *G06F 17/211* (2013.01); *G06F 17/241* (2013.01); *G06F 17/272* (2013.01); *G06F 17/30873* (2013.01); *G06Q 30/02* (2013.01)

(56) References Cited

U.S. PATENT DOCUMENTS

| | | | |
|---|---|---|---|
| 5,276,616 | A | 1/1994 | Kuga et al. |
| 5,339,391 | A | 8/1994 | Wroblewski et al. |
| 5,479,600 | A | 12/1995 | Wroblewski et al. |
| 5,636,350 | A | 6/1997 | Eick et al. |
| 5,644,692 | A | 7/1997 | Eick |
| 5,790,819 | A | 8/1998 | Rosenburg et al. |
| 5,820,386 | A | 10/1998 | Sheppard, II |
| 5,838,323 | A | 11/1998 | Rose et al. |
| 5,845,288 | A | 12/1998 | Syeda-Mahmood |
| 5,867,158 | A | 2/1999 | Murasaki et al. |
| 5,873,107 | A | 2/1999 | Borovoy et al. |
| 6,073,148 | A * | 6/2000 | Rowe et al. ............... 715/205 |
| 6,211,856 | B1 | 4/2001 | Choi et al. |
| 6,377,281 | B1 | 4/2002 | Rosenbluth et al. |
| 6,397,211 | B1 | 5/2002 | Cooper |
| 6,518,984 | B1 | 2/2003 | Maeckel et al. |
| 6,552,717 | B2 | 4/2003 | Mailman |
| 6,964,608 | B1 | 11/2005 | Koza |
| 7,234,942 | B2 | 6/2007 | Hu et al. |
| 7,310,084 | B2 | 12/2007 | Shitanaka et al. |
| 7,421,660 | B2 | 9/2008 | Charnock et al. |
| 7,689,933 | B1 | 3/2010 | Parsons |
| 7,716,224 | B2 | 5/2010 | Reztlaff, II et al. |
| 7,778,890 | B1 | 8/2010 | Bezos et al. |
| 7,793,230 | B2 | 9/2010 | Burns et al. |
| 7,836,408 | B1 | 11/2010 | Ollmann et al. |
| 7,881,957 | B1 | 2/2011 | Cohen et al. |
| 7,930,393 | B1 | 4/2011 | Baumback et al. |
| 7,970,897 | B1 | 6/2011 | Baumback et al. |
| 8,041,595 | B2 | 10/2011 | Robertson et al. |
| 8,051,385 | B1 | 11/2011 | Yawitz et al. |
| 8,065,626 | B2 | 11/2011 | Hoshino |
| 8,078,985 | B2 | 12/2011 | Sauermann |
| 8,090,724 | B1 * | 1/2012 | Welch ............... G06F 17/30616 707/750 |
| 8,115,769 | B1 | 2/2012 | Lymer et al. |
| 8,135,389 | B2 | 3/2012 | Forstall et al. |
| 8,150,695 | B1 | 4/2012 | Killalea et al. |
| 8,171,432 | B2 | 5/2012 | Matas et al. |
| D662,507 | S | 6/2012 | Mori et al. |
| 8,262,445 | B1 | 9/2012 | Spigner |
| 8,325,974 | B1 | 12/2012 | Killalea et al. |
| 8,589,399 | B1 | 11/2013 | Lee et al. |
| 8,635,531 | B2 | 1/2014 | Graham et al. |
| 8,842,085 | B1 * | 9/2014 | Goodspeed et al. ......... 345/173 |
| 2002/0059285 | A1 | 5/2002 | Fukushima et al. |
| 2002/0093496 | A1 | 7/2002 | Gould |
| 2003/0009459 | A1 | 1/2003 | Chastain et al. |
| 2003/0107178 | A1 | 6/2003 | Weston |
| 2003/0108854 | A1 | 6/2003 | Chan |
| 2003/0110162 | A1 | 6/2003 | Newman |
| 2003/0122873 | A1 | 7/2003 | Dieberger et al. |
| 2003/0139210 | A1 | 7/2003 | Raben |
| 2004/0029085 | A1 | 2/2004 | Hu et al. |
| 2004/0078190 | A1 | 4/2004 | Fass et al. |
| 2004/0095376 | A1 | 5/2004 | Graham et al. |
| 2005/0187910 | A1 | 8/2005 | Kladko |
| 2005/0283723 | A1 * | 12/2005 | Fish ............... 715/526 |
| 2006/0047500 | A1 | 3/2006 | Humphreys et al. |
| 2007/0050712 | A1 * | 3/2007 | Hull et al. ............... 715/530 |
| 2007/0192729 | A1 | 8/2007 | Downs |
| 2008/0039203 | A1 | 2/2008 | Ackley et al. |
| 2008/0040665 | A1 | 2/2008 | Waldeck |
| 2008/0077583 | A1 | 3/2008 | Castro et al. |
| 2008/0134033 | A1 | 6/2008 | Burns et al. |
| 2008/0138034 | A1 | 6/2008 | Hiroi et al. |
| 2008/0140412 | A1 | 6/2008 | Millman et al. |
| 2008/0163039 | A1 * | 7/2008 | Ryan et al. ............... 715/206 |
| 2008/0235207 | A1 | 9/2008 | Berkner et al. |
| 2008/0243828 | A1 * | 10/2008 | Reztlaff et al. ............... 707/5 |
| 2008/0294674 | A1 | 11/2008 | Reztlaff, II et al. |
| 2009/0055394 | A1 | 2/2009 | Schilit et al. |
| 2009/0099996 | A1 | 4/2009 | Stefik |
| 2009/0204609 | A1 | 8/2009 | Labrou et al. |
| 2009/0293019 | A1 | 11/2009 | Raffel et al. |
| 2010/0076979 | A1 | 3/2010 | Wang et al. |
| 2010/0145678 | A1 | 6/2010 | Csomai et al. |
| 2010/0145687 | A1 | 6/2010 | Huo et al. |
| 2010/0185689 | A1 | 7/2010 | Hu et al. |
| 2010/0223292 | A1 | 9/2010 | Bhagwan et al. |
| 2010/0268124 | A1 | 10/2010 | Hamilton et al. |
| 2010/0299149 | A1 | 11/2010 | Kurzweil et al. |
| 2011/0010617 | A1 | 1/2011 | Kim et al. |
| 2011/0055691 | A1 | 3/2011 | Carlen et al. |
| 2011/0087955 | A1 | 4/2011 | Ho et al. |
| 2011/0105232 | A1 | 5/2011 | Godfrey et al. |
| 2011/0106807 | A1 | 5/2011 | Srihari et al. |
| 2011/0167380 | A1 | 7/2011 | Stallings et al. |
| 2011/0179344 | A1 * | 7/2011 | Paxson ............... 715/205 |
| 2011/0261030 | A1 | 10/2011 | Bullock |
| 2011/0321071 | A1 | 12/2011 | McRae |
| 2012/0078612 | A1 | 3/2012 | Kandekar et al. |
| 2012/0078613 | A1 | 3/2012 | Kandekar et al. |
| 2012/0079372 | A1 | 3/2012 | Kandekar et al. |
| 2012/0079422 | A1 | 3/2012 | Hoshino |
| 2012/0120078 | A1 | 5/2012 | Hubbard |
| 2012/0124505 | A1 | 5/2012 | St. Jacques, Jr. |
| 2012/0166414 | A1 | 6/2012 | Decker et al. |
| 2012/0166634 | A1 | 6/2012 | Baumback et al. |
| 2012/0173659 | A1 | 7/2012 | Thaxter et al. |
| 2012/0179449 | A1 | 7/2012 | Raskino et al. |
| 2013/0074133 | A1 | 3/2013 | Hwang et al. |
| 2013/0124988 | A1 | 5/2013 | Lettau |
| 2013/0151954 | A1 | 6/2013 | Ierullo |

FOREIGN PATENT DOCUMENTS

| | | |
|---|---|---|
| JP | 2005063283 | 3/2005 |
| JP | 2005259088 | 9/2005 |
| JP | 2008148077 | 6/2008 |
| JP | 2009129009 | 6/2009 |
| JP | 2010511936 | 4/2010 |

OTHER PUBLICATIONS

The Korean Office Action mailed Jan. 2, 2012 for Korean design application No. 30-2011-46560, a counterpart foreign application of Design U.S. Appl. No. 29/402,813, 2 pages.

The Japanese Office Action mailed Jun. 29, 2012 for Japanese design application No. 2011-23927, a counterpart foreign application of Design U.S. Appl. No. 29/402,813, 3 pages.

Hearst, "Information Visualization for Search Interfaces", Cambridge University Press, 2009, 41 pages.

Office action for U.S. Appl. No. 13/246,796, mailed on Feb. 15, 2013, Goodspeed et al., "Providing Supplemental Information for a Digital Work in a User Interface", 21 pages.

The PCT Search Report mailed Nov. 20, 2012 for PCT application No. PCT/US12/56634, 7 pages.

Office Action for U.S. Appl. No. 13/246,759, mailed on Jan. 17, 2014, Joshua M. Goodspeed, "Providing Supplemental Information for a Digital Work", 11 pages.

(56) References Cited

OTHER PUBLICATIONS

Office action for U.S. Appl. No. 13/424,046, mailed on Jun. 26, 2014, Tseng et al., "Generating a Game Related to a Digital Work", 23 pages.
Morse, "Document Visualization", at http://www.itl.nist.gov/iaui/vvrg/emorse/papers/soa/DocumentVisualization/htm, retrieved on Feb. 7, 2013, 2009, 39 pages.
Office Action for U.S. Appl. No. 13/424,046, mailed on Oct. 7, 2013, Walter Manching Tseng, "Generating a Game Related to a Digital Work", 20 pages.
Office action for U.S. Appl. No. 13/246,796, mailed on Jul. 19, 2013, Goodspeed et al., "Providing Supplemental Information for a Digital Work in a User Interface", 26 pages.
Office Action for U.S. Appl. No. 13/246,796, mailed on Mar. 27, 2014, Joshua M. Goodspeed, "Providing Supplemental Information for a Digital Work in a User Interface", 21 pages.
Anastacio, et al., "Supervised Learning for Linking Named Entries to Knowledge Base Entries", Text Analysis Conference (TAC2011) Nov. 14-15, 2011, pp. 1-12.
Coursey, et al., "Using Encyclopedic Knowledge for Automatic Topic Identification", Thirteenth Conference on Computational Natural Language Learning, CoNLL, 2009, pp. 210-218.
Han, et al., A Generative Entity-Mention Model for Linking Entities with Knowledge Base, Institute of Software, Chinese Academy Sciences, Beijing, China, 2011, pp. 945-954.
Mihalcea, et al., "Wikify!: Linking Documents to Encyclopedic Knowledge", CIKM '07, 2007, pp. 1-9.
Nguyen, et al., "Exploring Wikipedia and Text Features for Named Entity Disambiguation", Intelligent Information and Database Systems, 2010, vol. 5991, pp. 11-20.
Office Action for U.S. Appl. No. 13/433,028, mailed on Apr. 16, 2015, Joshua M. Goodspeed, "Identifying Topics in a Digital Work", 17 pages.
Schonhofen, "Identifying document topics using the Wikipedia category network", 2006 IEEE/WIC/ACM Internation Conference of Web Intelligence, 2006, pp. 471-480.
The Japanese Office Action mailed Mar. 31, 2015 for Japanese patent application No. 2014-532016, a counterpart foreign application of U.S. Appl. No. 13/246,773, 10 pages.
Givon, "Extracting Information from Fiction", Master of Science Thesis, University of Edinburgh, 2006, pp. 1-138.
Office Action for U.S. Appl. No. 13/431,838, mailed on Feb. 13, 2015, Joshua M. Goodspeed, "Identifying Entities in a Digital Work", 21 pages.
Office Action for U.S. Appl. No. 13/246,773, mailed on Feb. 26, 2015, Joshua M. Goodspeed, "Visual Representation of Supplemental Information for a Digital Work", 22 pages.
Walkenbach, "Excel 2010 Bible", Wiley, Massachusettes, 2010, pp. 418, 482.

The Indian Office Action mailed Aug. 14, 2014 for Indian design application No. 240305, a counterpart foreign application of US design patent No. D674,810, 7 pages.
Final Office Action for U.S. Appl. No. 13/246,796, mailed on Jan. 15, 2015, Joshua M. Goodspeed, "Providing Supplemental Information for a Digital Work in a User Interface", 27 pages.
Office Action for U.S. Appl. No. 13/425,116, mailed on Nov. 17, 2014, Joshua M. Goodspeed, "Supplemental Information for a Digital Work", 17 pages.
The Extended European Search Report mailed Jul. 15, 2015 for European patent application No. 12833911.6, 6 pages.
Office Action for U.S. Appl. No. 13/424,046, mailed on Jul. 15, 2015, Walter Manching Tseng, "Generating a Game Related to a Digital Work", 26 pages.
The Chinese Office Action mailed Jan. 14, 2016 for Chinese patent application No. 201280046482.3, a counterpart foreign application of U.S. Appl. No. 13/246,773.
The Japanese Office Action mailed Oct. 6, 2015 for Japanese patent application No. 2014-532016, a counterpart foreign application of U.S. Appl. No. 13/246,773, 7 pages.
Office action for U.S. Appl. No. 13/246,773mailed on Nov. 12, 2015, Goodspeed et al., "Visual Representation of Supplemental Information for a Digital Work", 23 pages.
Office action for U.S. Appl. No. 13/431,838 mailed on Nov. 13, 2015, Goodspeed, "Identifying Entities in a Digital Work", 43 pages.
Office action for U.S. Appl. No. 13/433,028, mailed on Dec. 4, 2015, Goodspeed et al., "Identifying Topics in a Digital Work", 38 pages.
Office action for U.S. Appl. No. 13/425,116 mailed on Sep. 3, 2015, Goodspeed et al., "Supplemental Information for a Digital Work", 20 pages.
Office action for U.S. Appl. No. 13/424,046, mailed on Feb. 26, 2016, Tseng et al., "Generating a Game Related to a Digital Work", 14 pages.
Office action for U.S. Appl. No. 13/431,838, mailed on Mar. 10, 2016, Goodspeed et al., "Identifying Entities in a Digital Work", 42 pages.
Office action for U.S. Appl. No. 13/433,028, mailed on Mar. 31, 2016, Goodspeed et al., "Identifying Topics in a Digital Work", 44 pages.
Office action for U.S. Appl. No. 13/246,773, mailed on May 12, 2016, Goodspeed et al., "Visual Representation of Supplemental Information for a Digital Work", 25 pages.
Office action for U.S. Appl. No. 13/425,116, mailed on May 6, 2016, Goodspeed et al.,"Supplemental Information for a Digital Work", 22 pages.
Wikipedia, "Index (Publishing)", Wikipedia entry, Retreived from <<https://web.archive.org/web/20110205135612/http:en.wikipedia.org/wiki/Index_(publishing)>>, Available as early as Feb. 2011, 4 pages.

* cited by examiner

100

104 — The Wonderful Wizard of Oz

"You promised to send me back to Kansas when the Wicked Witch was destroyed," said the girl.
"And you promised to give me brains," said the Scarecrow.
110 — "And you promised to give me a heart," said the Tin Woodman.
"An[d you] promised to give me courage," said the Co[wardly] Lion.
"Is [the Wi]cked Witch really destroyed?" asked the Voi[ce, and] Dorothy thought it trembled a little.
"Ye[s," she] answered, "I melted her with a bucket of wate[r."]
"Dea[r me," s]aid the Voice, "how sudden! Well, come [to me to]morrow, for I must have time to think it over[." 106]
"You've [had] plenty of time already," said the Tin Woodma[n] angrily.
"We shan't wait a day longer," said the Scarecrow.
"You must keep your promises to us!" exclaimed Dorothy.
The Lion thought it might be as well to frighten the Wizard, so he gave a large, loud roar, which was so fierce and dreadful that Toto jumped away from him in alarm and tipped over the screen that stood Page 71 of 131

NAVIGATING SUPPLEMENTAL INFORMATION FOR A DIGITAL WORK

CROSS-REFERENCE TO RELATED APPLICATION

This application claims the benefit of U.S. Provisional Patent Application No. 61/538,715, filed Sep. 23, 2011, the entire disclosure of which is incorporated herein by reference.

BACKGROUND

The continued proliferation of digital works has led to an increase in the availability of such works, as well as an increase in the availability of electronic devices used for consuming these works. For instance, users now consume digital works, such as electronic books (eBooks), digital videos, digital songs, digital images, and the like, on an assortment of electronic devices. As the number of digital works and devices for consuming digital works continues to increase, users are ever more interested in enhancing their experiences while consuming these works.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates an example device providing access to supplemental information according to some implementations.

DETAILED DESCRIPTION

Figure 2:
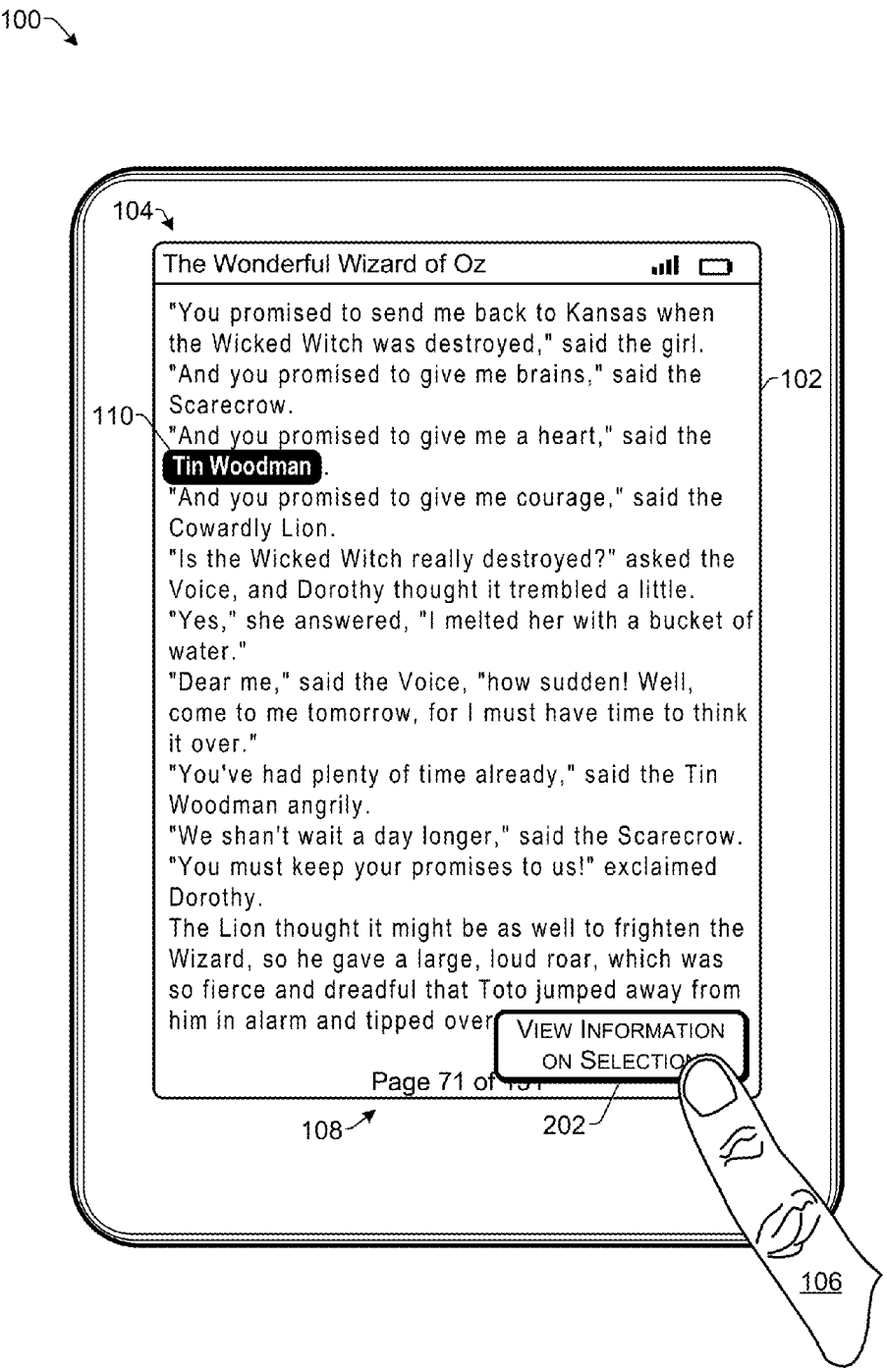
FIG. 2 illustrates an example of accessing supplemental information according to some implementations.

This disclosure includes techniques and arrangements for providing supplemental information in association with a digital work, such as a digital work that includes textual content or has textual content associated therewith. As one example, a user may select an object, such as a word, phrase or name displayed in a digital work. In response to the selection, the user may be presented with supplemental information regarding the selected object. In some implementations, the digital work may be displayed on an electronic device, and the supplemental information in connection with the digital work may be displayed in a user interface provided on the electronic device. In some examples, the user interface presents supplemental information that includes a visual representation of one or more locations of instances of the selected object in the digital work. Further, in addition to presenting the visual representation of locations of the selected object in the digital work, the user interface may present one or more visual representations of locations of other objects derived from the digital work that may also be of interest to the user.

As one non-limiting example, suppose that the user is reading an electronic book (eBook) and encounters the name of a character that the user does not recognize or cannot recall. The user may select the name of the character from the displayed text of the eBook. In response to the selection, the device may present a user interface that displays a visual representation of other locations or occurrences within the eBook where the character's name (or variations thereof) also appears. Accordingly, the user may employ the user interface to refer to another location in the eBook to determine the identity or significance of the selected character. For example, the user interface may be further navigated to present excerpts from the book of one or more other instances at which the character's name appears along with surrounding text.

In some implementations, the user may be able to select numerous different types of objects from the text of a digital work for obtaining supplemental information about a selected object. As several non-limiting examples, an object may refer to characters or people, places, things, interactions, organizations, relationships, popular highlights, topics, citations, scenes, events, significant words or phrases, and timelines or time periods, to name a few. The user may navigate through the user interface between a page view, a chapter view, and a book view for the digital work to view visual representations of the locations of objects of significance in the digital work on a per page, per chapter or per book basis. Additionally, in the case that the digital work is part of a series of digital works, such as a series of books, the user interface may provide navigation to a series view that shows locations of a selected object with respect to the entire series of digital works.

Furthermore, the user interface may also provide the ability to navigate to a library view that may present locations of a selected object in an entire library of digital works, such as a library of all of the digital works maintained on the particular electronic device or, in other implementations, an entire library of digital works possessed by a digital work provider. Thus, the library view may display a listing of titles of a plurality of digital works that include the selected object and enable the user to view occurrences of the selected object in the plurality of digital works, such as in a plurality of other books, movies, television shows, songs, and so forth. For example, the library view may provide a visual representation for each listed digital work that indicates a frequency and location of occurrences of the selected object in the other digital works in the library.

In some implementations, the user interface may present prestored content as part of the supplemental information provided in the user interface. For example, the user may navigate the user interface to view supplemental information about the selected object. The supplemental information may include prestored content, such as an excerpt of an article, essay, commentary, discussion or other composition drawn from an authoritative source that provides supplemental information about the selected object. In some instances, the excerpt is prestored on the electronic device with other supplemental information and, thus, may be provided to the user in the user interface whether the device is connected to a network or not. Additionally, the prestored content presented in the user interface may include a link, such as a hyperlink or other reference identifier, to enable the user to navigate to a network location to view a full version of the article or discussion of the selected object from which the prestored content is drawn. In some examples, multiple reference identifiers may be provided to enable the user to automatically access several different online sources of information regarding the selected object.

In some implementations, a digital work provider may generate supplemental information for each digital work provided by the digital work provider. For example, the digital work provider may analyze a digital work and from the digital work may generate supplemental information, such as the identification of objects in the digital work and the locations of occurrences of the objects in the digital work. In some instances, the digital work provider may generate an index for each digital work that can be used to generate the visual representations and other supplemental information on the electronic device. The digital work provider may also obtain additional or external content related to objects identified in a digital work from one or more authoritative sources, such as one or more online sources of information. The digital work provider may include this content as prestored content provided with the supplemental information for a corresponding digital work. Alternatively, one or more links or reference identifiers (e.g., hyperlinks, network location identifiers, uniform resource locators (URLs), etc.) for the content may be provided with the supplemental information in place of the prestored content. Thus, in some examples, rather than including the prestored content in the supplemental information, one or more reference identifiers may be displayed that can be selected by a user to obtain the content dynamically from a network location.

In some instances, the digital work provider may provide the supplemental information to the electronic device when providing a corresponding digital work. For example, when the electronic device accesses or receives a digital work from the digital work provider, the supplemental information may be accessed or received as part of a package that includes the digital work. Thus, in the case that the digital work is downloaded from the digital work provider, the supplemental information may be downloaded by the electronic device contemporaneously with the digital work, such as before, during or after the download of the digital work. For example, the supplemental information for a particular digital work may be stored on the electronic device as metadata associated with a particular digital work. Thus, in some instances the supplemental information is stored on the electronic device separately from the corresponding digital work.

Alternatively, the supplemental information may not be provided with the digital work, but rather a reference identifier that identifies the location of the supplemental information may be provided with the digital work. Accordingly, based on the reference identifier included with a particular digital work, the electronic device may access and obtain the supplemental information corresponding to the particular digital work under a number of different circumstances. For example, the electronic device may receive the supplemental information for a particular digital work when the particular digital work is received by the electronic device. In other examples, the electronic device may access or receive the supplemental information for a digital work when the digital work is first opened or displayed on the electronic device. As another example, the electronic device may access or receive the supplemental information in response to a user input to view the supplemental information, such as through selection of a particular object referenced in the digital work. In some instances, only a requested portion of the supplemental information is received by the electronic device, such as on an as-requested basis. In other instances, the electronic device receives a package of supplemental information prepared for the particular digital work so that the supplemental information may be accessed locally on the electronic device.

Furthermore, the digital work provider may provide updates to the supplemental information. For example, if the prestored content included with the supplemental information is updated or changed, the digital work provider may provide these updates to the electronic device. In some instances, a policy is applied to determine whether the content has changed a sufficient amount to warrant providing an update to the prestored content. Additionally, one or more links or reference identifiers (e.g., hyperlinks, network location identifiers, uniform resource locators (URLs) etc.) to online sources of information and content about the objects may be updated in the supplemental information, or new links may be added, through the provision of updated supplemental information. Similarly, when other aspects of the supplemental information change, the supplemental information on the electronic device may be updated with this changed information. For example, with respect to the library view, new digital works may be produced that include one or more objects also in an existing digital work. Accordingly, the digital work provider may update the supplemental information relating to objects in existing digital works already stored on the electronic device by adding the occurrences and locations of the objects in the new digital works. Various other types of updates may also be made to the supplemental information.

Some example implementations are described in the environment of an electronic device displaying several example configurations of user interfaces for discussion purposes. However, the implementations herein are not limited to the particular examples provided, and may be extended to other user interface configurations, other types of devices, and other types of technologies, as will be apparent to those of skill in the art in light of the disclosure herein.

Example Interfaces

FIG. 1 illustrates an example electronic device 100 that provides access to supplemental information for digital works according to some implementations herein. The electronic device 100 may be implemented as any of a number of electronic devices, such as an eBook reader, a media player, a tablet computing device, a smart phone, a portable gaming device, a portable digital assistant, a laptop or netbook computer, and so forth. Furthermore, the electronic device 100 may not necessarily be a mobile or portable device, and thus, in some implementations may include a display of a desktop or other computing device, a gaming system, a television, other home electronics devices, and so forth.

The electronic device 100 includes a display 102 for displaying a digital work 104 or other image or interface to a user. In some examples, the display 102 may be a touchscreen type of display configured with a sensor to sense a touch input received from an input effecter 106, such as a finger of a user, a stylus, or other pointer. Thus, the touchscreen may receive one or more touch inputs, interactions, selections of displayed objects, and so forth.

In other implementations, the display may be non-touch sensitive. Accordingly, in addition to, or as an alternative to, a touch sensitive display, the electronic device 100 may include various external controls and input devices. For example, some implementations (not shown in FIG. 1) of the electronic device 100 may include a virtual or physical keyboard, a mouse, a pointing stick, a touchpad, a trackball, a joystick, a remote control, buttons and/or various other controls for performing various desired inputs and interactions with the electronic device 100 and digital works 104 displayed on the display 102, and which may include selection of one or more objects in the digital works. Additionally, in other implementations, one or more voice commands may be used to control or interact with the interfaces herein, such as for selection of objects and performing other functions. Thus, implementations herein are not limited to any type of input devices, techniques, or controls.

In some implementations, the digital work 104 may be an electronic book (eBook) having one or more pages of text. For example, the display 102 may depict the text of the eBook and also any illustrations, tables, maps, or graphic elements that might be contained in the eBook. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, and so forth. Accordingly, the terms "book" and/or "eBook" may include any readable or viewable textual content that is in electronic or digital form. Additionally, some implementations herein are not limited to digital text, but may also include other digital works, such as digital audio (e.g., music, audible books, etc.), digital video (e.g., movies, television, short clips, etc.), images (e.g., art, photographs, etc.), and multi-media content, as described additionally below.

In the illustrated example of FIG. 1, suppose that the digital work 104 that the user is reading is *The Wonderful Wizard of Oz* by L. Frank Baum, and that page 71 of the digital work is currently displayed on the display 102 of the electronic device 100, as indicated by the displayed page number 108. Furthermore, suppose that the user desires to obtain more information regarding the Tin Woodman character of the digital work 104. As illustrated in FIG. 1, the user may select an instance of the name of the Tin Woodman currently displayed on the electronic device 100 as an object 110. For example, in the case that the display 102 includes a touch screen, the user may use the input effecter 106 (e.g., a finger) to select the name of the Tin Woodman. In other examples, the user may use other input controls, as described above, to select the object 110, depending on the particular type and configuration of the electronic device 100. For example, the user may employ a mouse, a pointing stick, a touchpad, a trackball, a joystick, a remote control, buttons and/or various other controls for selecting objects displayed in the digital work 104 on the display 102. Further, the objects that may be selected are not limited to words or phrases, but may include symbols, icons, images, figures, selectable areas of an image or video, and so forth. For example, in the case that the digital work is an image or video, examples of objects may include an image of a person or thing included in the image or video. Similarly, textual digital works may include symbols, maps, tables, images, and the like, that may also be objects that are selectable for viewing supplemental information according to some implementations herein.

FIG. 2 further illustrates an example electronic device 100 that provides access to supplemental information according to some implementations herein. Thus, in some implementations, following the selection of the object 110, the electronic device 100 may display a button or other virtual control 202 that may be selected by the user to view supplemental information available in connection with the selected object 110. Accordingly, in these implementations, the user may select the virtual control 202 to display a supplemental information user interface, as discussed below with respect to FIG. 3. Furthermore, in other implementations, the virtual control 202 is not displayed and/or other inputs may be used to cause display of the user interface. For example, the supplemental information user interface may be displayed in response to various inputs or combinations of inputs, such as double tapping on the object 110, maintaining contact of the input effecter 106 with the object 110 for a predetermined period of time, or other types or combinations of user inputs as will be apparent to those of skill in the art in view of the disclosure herein.

Figure 3:
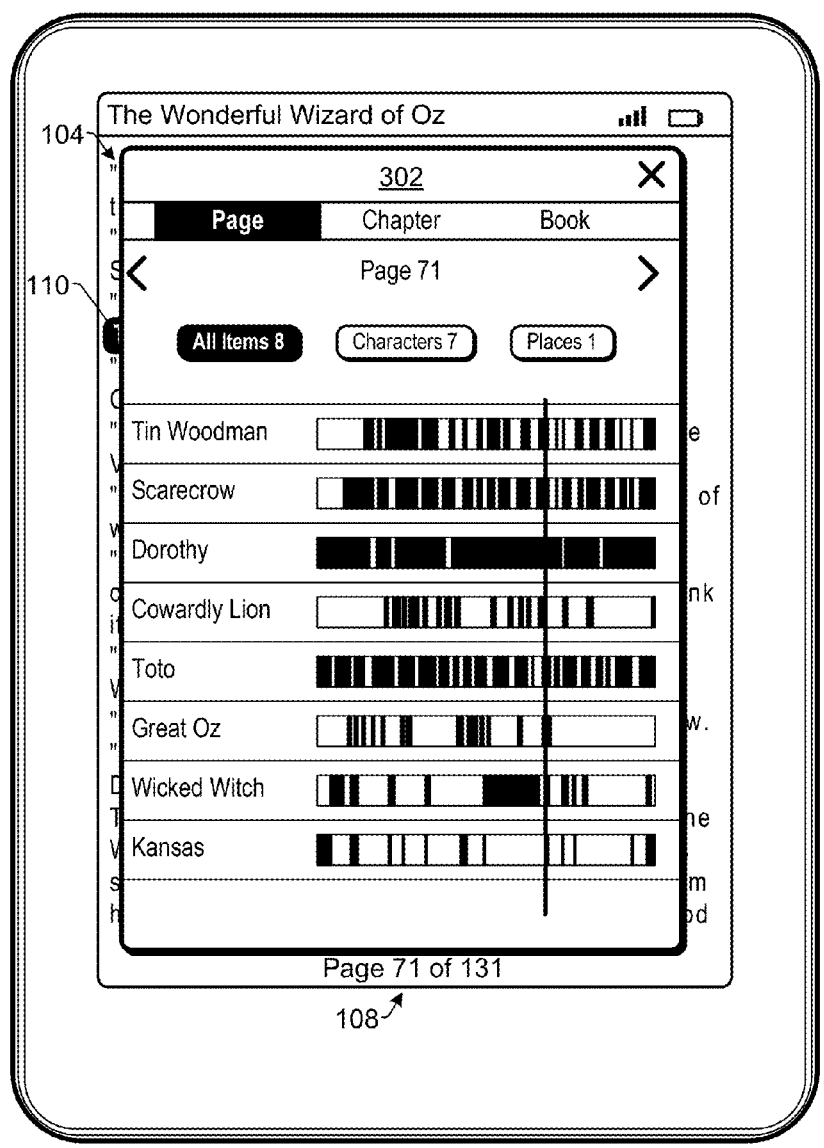
FIG. 3 illustrates an example interface for providing supplemental information according to some implementations.

FIG. 3 illustrates an example of the electronic device 100 providing access to supplemental information through display of a page view user interface 302 according to some implementations herein. In this example, following the selection of the virtual control 202 by the user, or in response to other user input received from the user in association with the object 110, the electronic device may display the user interface 302 as a pop-up or overlay displayed overtop of the digital work 104. In other implementations, the user interface 302 may be displayed as a separate window or screen encompassing all or a portion of the display 102. In yet other examples, the interface 302 may be displayed in a split screen arrangement in which the user interface 302 is displayed in a first portion of the display 102 and the digital work continues to be displayed in a second portion of the display 102, such as in a reduced size. Numerous other variations will also be apparent to those of skill in the art in view of the disclosure herein.

Figure 4:
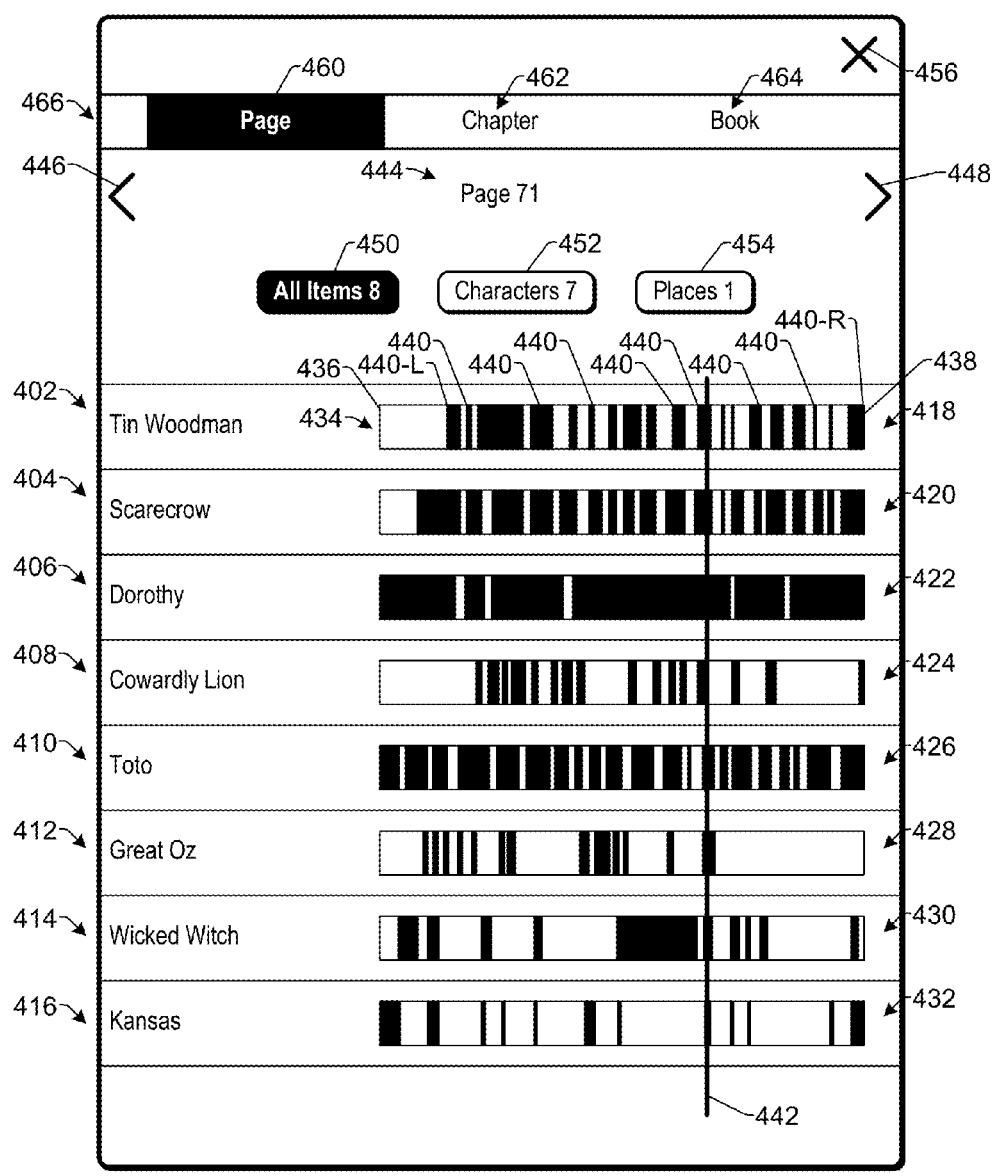
FIG. 4 illustrates an enlarged view of the example interface of FIG. 3 for providing supplemental information, depicting a page view user interface according to some implementations.

FIG. 4 illustrates an enlarged view of the page view user interface 302 of FIG. 3 according to some implementations herein. In this example, the user interface 302 presents a plurality of objects identified on the particular page of the digital work 104 at which the user selected the object 110, as described above. For example, page 71 of the digital work 104 identifies eight objects in total, including seven characters and one place. Accordingly, as mentioned above, the objects, such as characters, places, things, phrases of interest, events, popular highlights, and so forth, may be identified in a digital work in advance by the digital work provider. The digital work provider may then provide supplemental information, such as the location and occurrence of each object identified in the digital work, to the electronic device along with the digital work.

In the illustrated example, the page view user interface 302 displays the objects identified in page 71 of the digital work 104. Accordingly, in this example, the user interface 302 displays a listing 402 for the Tin Woodman, a listing 404 for the Scarecrow, a listing 406 for Dorothy, a listing 408 for the Cowardly Lion, a listing 410 for Toto, a listing 412 for the Great Oz, a listing 414 for the Wicked Witch, and a listing 416 for Kansas. Associated with each item listing 402-416 is a visual representation that provides an indication of a location and frequency of each object in the digital work 104. Thus, the interface 302 provides a visual representation 418, for the Tin Woodman, a visual representation 420 for the Scarecrow, a visual representation 422 for Dorothy, a visual representation 424 for the Cowardly Lion, a visual representation 426 for Toto, a visual representation 428 for the Great Oz, a visual representation 430 for the Wicked Witch, and a visual representation 432 for Kansas.

In some examples, the objects displayed in the page view user interface 302 may be displayed in an order in which the objects appear on the particular page from which the page view user interface 302 is drawn. As another example, the listed objects in the page view user interface 302 (and the other user interfaces described herein) may be displayed in an order of frequency of occurrence of each object in the digital work. For instance, the object occurring most frequently in the digital work may be listed first, and the other objects may be listed in a descending order of frequency. Further, when there are more objects listed than will fit on the view in the user interface, the listing may automatically scroll to display the selected object within the listing. As another example, the selected object may be listed first and the remaining objects may be displayed in the order of appearance on the page or an order of frequency. As some additional examples, the listed objects may be displayed in alphabetical order or according to a category or type of object. Numerous other variations will be apparent to those of skill in the art in light of the disclosure herein, with the foregoing merely being several non-limiting examples. Further, the page view user interface 302 and the other user interfaces described herein may include a control or button (not shown) for switching between various ordering arrangements for the objects. For example, the control may enable switching between ordering based on frequency, to ordering based on order of occurrence in the page or digital work, order based on type, or alphabetical ordering. As another example, the control may enable switching between displaying the most the frequently occurring objects listed first to displaying the least frequently occurring objects listed first, and so forth.

The visual representations 418-432 may represent both the location and frequency of occurrence of each corresponding object in the digital work 104. For example, with respect to the visual representation 418 for the Tin Woodman, the visual representation 418 includes an area 434 extending between a first side 436 that is representative of a beginning of the digital work 104 and a second side 438 that is representative of an end of the digital work 104. In this example, the area 434 has a rectangular outline; however, other shapes and types of representations may also be used as discussed below. For example, in some implementations, the area 434 may not have an outline or shape. The area 434 extends from the first side 436 to the second side 438 and may be representative of the expanse (e.g., a total number of pages, a total runtime, a total number of locations, etc.) of the digital work that the visual representation 418 symbolizes.

At least one vertical line, bar or other type of marking 440 may be located in the area 434. The marking 440 may correspond to at least one referenced of the object in the digital work. Further, in some implementations, the location of the marking 440 may generally correspond to a location of the occurrence of the object in the digital work itself. In the illustrated example, with respect to the visual representation 418 for the object Tin Woodman, a plurality of markings 440 are located within the area 434 corresponding to a plurality of occurrences of the object Tin Woodman, or variations thereof, in the text of the digital work 104. For example, a leftmost first marking 440-L, closest to the first side 436, represents the first occurrence of the object Tin Woodman in the digital work 104. A rightmost second marking 440-R, closest to the second side 438, represents the location of the final occurrence of the object Tin Woodman in the digital work 104.

The other markings 440 located between the first marking 440-L and the second marking 440-R may represent other occurrences of the object Tin Woodman in the digital work 104 at various locations corresponding to the locations of occurrences of the object Tin Woodman in the digital work. For example, for each page in the digital work on which the object Tin Woodman's name, or a variation thereof, appears, a marking 440 may be applied to the visual representation 418. Accordingly, in some implementations, if the resolution of the display 102 permits, the visual representation 418 may be generally to scale with a number of pages in the digital work 104, with each marking 440 representing at least one page in the digital work 104 and being in a location corresponding to or proportional to the location of the page in the digital work out of a total number of the pages in the digital work. Thus, in some examples, occurrences of the object Tin Woodman on adjacent pages may appear as a single larger continuous marking 440. Further, in some examples, a marking 440 between the first side 436 and the second side 438 may be at a location that is proportional to a location of a page corresponding to the occurrence between the first page and the last page of the digital work.

Additionally, in some examples, such as in the case of a digital work that is a movie, song or television show, the digital work may have a total runtime, and the location of the marking in the visual representation may be proportional to an elapsed runtime of the occurrence out of a total runtime of the digital work. Further, in some examples, the digital work may have length analogous to a total text content, and the marking in the visual representation may correspond to a location of the occurrence of the object in the text content in relation to the total text content. In other examples, as described below, depending on the resolution of the display 102, other types of markings may be used that may provide additional details, such as the number of occurrences of the object on each page of the digital work. Accordingly, numerous variations will be apparent to those of skill in the art in light of the disclosure herein.

Furthermore, in the example of FIG. 4, the page view user interface 302 is rendered based on page numbers of the digital work 104. In other implementations, however, rather than using page numbers, the page view user interface 302 may be rendered based on location numbers determined for the digital work 104. For instance, in some devices or platforms, a digital work is not displayed with page numbers or may not have page numbers associated therewith. As one example, because various different display conditions may exist during the rendering of a digital work on various different devices having various different display sizes and resolutions, page numbering may not apply to a digital work on some devices or platforms. In such a case, the digital work provider may use invariant referencing to assign location numbers to parts of the digital work. The location numbers may remain constant for the parts of the digital work regardless of a screen size, font type, font size or other variations in the display conditions of the digital work. Additional information on assigning location numbers to parts of a digital work is provided in U.S. Pat. No. 7,865,817 to Ryan et al., the entire disclosure of which is incorporated herein by reference.

Accordingly, in these implementations, rather than using page numbers, the digital work 104 of FIG. 1 may be displayed as one or more location numbers, such as a range of location numbers out of a total number of locations in the digital work 104. Consequently, the interface 302 may be generated based on the range of locations rendered on the display 102 when the selection of the object 110 is made. For example, suppose that the text of the digital work 104 displayed in FIG. 1 corresponds to locations 244-255 out of a total 347 locations. Therefore, the listings 402-416 displayed in the user interface 302 would correspond to the occurrence of the objects contained in locations 244-255 currently rendered on the display 102.

Additionally, in the examples of digital works in which assigned locations are used instead of page numbers, the area 434 of the visual representation 418 may represent an expanse of the total locations in the digital work, from the first location on the first side 436 to the last location on the second side 438. Thus, the location of a marking 440 in the visual representation may correspond to a location of the occurrence in the digital work and may be at a location between the first side 436 and the second side 438 that is proportional to a location of the occurrence in the digital work. For purposes of this description, regardless of whether page number or location identifiers are used, for ease of explanation a "page" will refer to the visible text that is displayed on the device and is not dependent upon a physical page size or font.

Referring again to FIG. 4, a vertical line 442 may be displayed in the user interface 302, traversing or passing through the visual representations 418-432, to indicate the location of the currently rendered page 71 (or equivalent location number range) with respect to the overall digital work 104. Further, the current page number corresponding to the location of the vertical line 442 and the displayed listings 402-416 is indicated at 444. For example, the user may navigate the user interface 302 to other pages in the digital work, such as by selecting a left arrow 446 or a right arrow 448 to move backwards or forwards in the digital work 104, respectively. As one non-limiting example, the user may tap the left arrow 446 one time to move the user interface 302 from the representation of objects on page 71 to a representation of objects on page 70 of the digital work 104.

As the user navigates from one page to another, listings of various object may disappear or appear in the user interface 302. For example, the object Kansas may not be mentioned on page 70 of the digital work 104. Consequently, when the user navigates the user interface 302 from a page view for page 71 to a page view for page 70, the listing 416 and visual representation 432 for the object Kansas may disappear while a listing and visual representation for one or more other objects referenced on page 70 may be added to the user interface 302. In some instances, rather than just disappearing or being suddenly replaced, a fade effect may be applied such that the objects may fade in and out to enable the user to track which object are not present on particular pages. Additionally, in some examples, rather than tapping the left arrow 446 or the right arrow 448 to navigate to a page view for a different page, the user may select or otherwise drag the vertical line 442 left or right to a different location with respect to the visual representations. The user can then view the user interface representation with respect to a different page, and the current page is identified by the page number indicator 444.

In the illustrated example, the total number of different objects referenced on page 71 is indicated in an "all items" button 450, which in this example indicates that there are a total of eight objects, which correspond to the eight listings 402-416. Further the number of character objects on page 71 is indicated in a characters button 452 (i.e., seven in this example), while the number of place objects contained on page 71 is indicated in a places button 454 (i.e., one in this example). In this example, the all items button 450 is currently selected and, thus, all eight of the objects referenced on page 71 are displayed in the user interface 302. On the other hand, if the user wanted to view just the character objects referenced on page 71, the user could select the characters button 452 to display a listing of just the character objects in the user interface 302 (i.e., listings 402-414). Similarly, if the user wanted to view just the place objects referenced on page 71, the user may select the places button 454 and only the listing 416 corresponding to the place objects (in this example Kansas) would be shown in the user interface 302. Further, numerous other types of object buttons (e.g., phrases, things, organizations, etc.) may be displayed when those types of object are available on the particular page for which the supplemental information is being presented. However, when those types of object are not available on the page corresponding to the current page view interface 302, then the object buttons for those object types may also not be displayed.

The techniques described above may be employed to navigate the page view interface 302 to the presentation of a page view interface 302 corresponding to a different page. When the user navigates the user interface 302 to a different page, the corresponding different page from the digital work may be rendered on the display 102 underneath the user interface 302. Accordingly, the page of the digital work displayed on the display 102 may change in correlation with the movement of the vertical line 442 to various different pages in the digital work 104. For example, suppose that the user wishes to move to the first occurrence at which the object Tin Woodman appears in the digital work 104 to reread that portion of the digital work (e.g., page 37). The user may move the vertical line 442 to the beginning of the leftmost marking 440-L. Based on this movement of the vertical line 442, the device may then change the page rendered on the display 102 to correspond to the page at which the vertical line 442 is currently located, i.e., page 37. The user may then close the user interface 302, such as by tapping on a close-window control 456 (e.g., an X in the upper right corner of the interface 302). This action will close the user interface 302 and present the user with the text of page 37 at which the object Tin Woodman is first mentioned in the digital work 104. Accordingly, the user may employ the user interface 302 to navigate through the digital work 104 to locations of various objects of interest.

As mentioned above, the page view user interface 302 displays a page view which displays the objects referenced on the currently rendered page. Accordingly, the user interface 302 may indicate that the current view is the page view. Several non-limiting examples of indicators include highlighting a word "page" 460, outlining the word "page" 460, bolding the word "page" 460, enlarging the word "page" 460, placing a marker or pointer under or above the word "page" 460, or other suitable indicator may be provided to indicate that the current view is the page view. The user interface 302 may also indicate that a chapter view and a book view are available for selection based on presentation of the word "chapter" 462 and the word "book" 464, as indicated in a header 466 of the user interface 302. For example, if the user desires to view the chapter view or the book view, the user may select the corresponding word "chapter" 462 or "book" 464 to switch to a chapter view user interface or book view user interface, respectively. Further, some digital works may not have "chapters." Consequently, for these digital works, the word "chapter" 462 may not be present in the page view user interface 302, but the option to navigate to the book view may remain.

Figure 5:
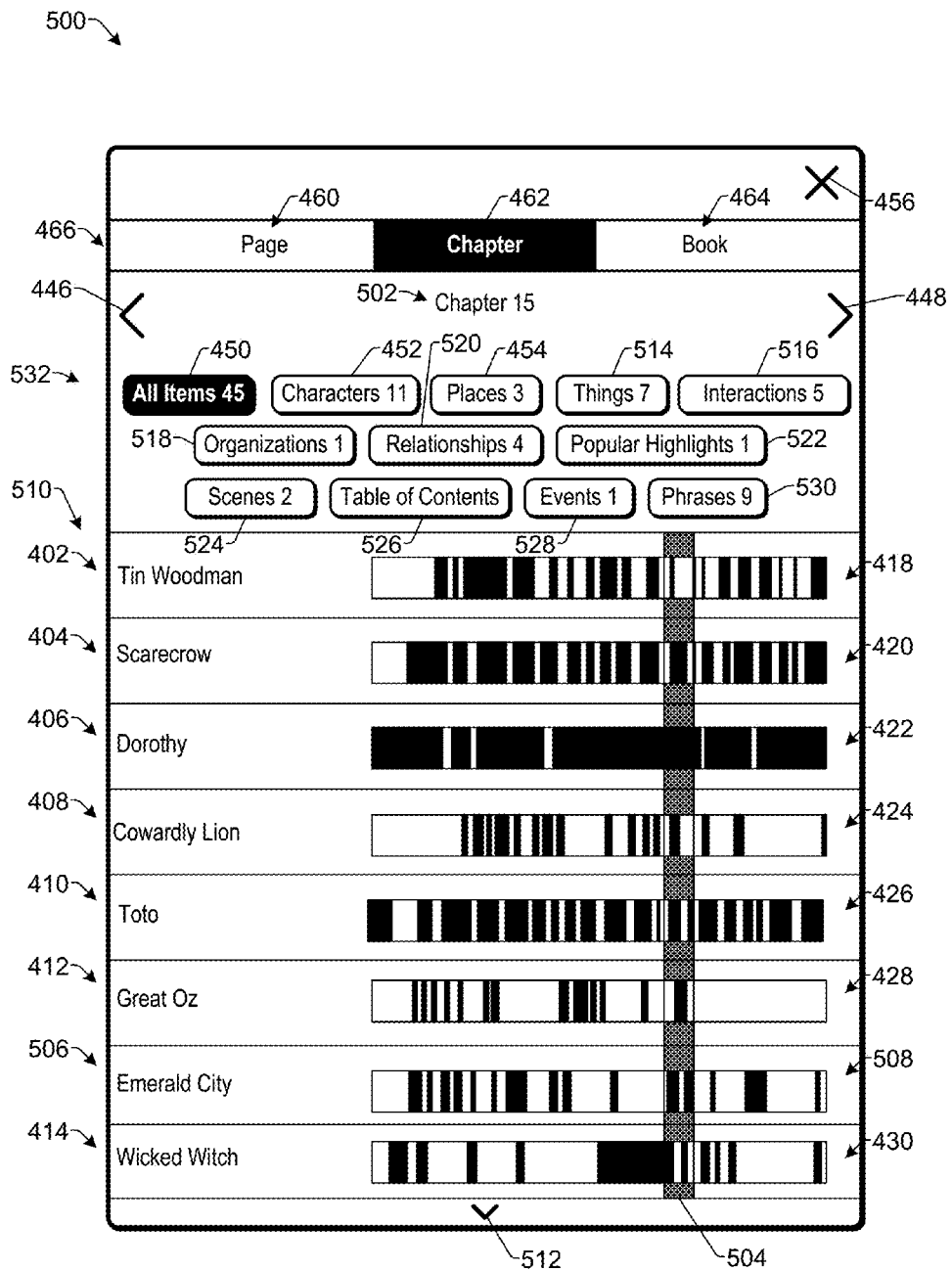
FIG. 5 illustrates an example interface for providing supplemental information, depicting a chapter view user interface according to some implementations.

FIG. 5 illustrates an example chapter view user interface 500 that may be presented when the user navigates to the chapter view according to some implementations. For example, the header 466 may indicate that the view currently presented is the chapter view. As several non-limiting examples, the word "chapter" 462 may be highlighted, outlined, bolded, enlarged, etc., a marker or pointer may be placed beneath or above the word "chapter" 462, or other suitable indicator may be displayed to indicate that the chapter view is being presented. Furthermore, the chapter corresponding to the currently displayed page (e.g., page 71) of the digital work may be identified at 502. Accordingly, in this example, since page 71 is in chapter 15 of the digital work 104, "chapter 15" is shown at 502.

In chapter view user interface 500, the vertical line 442 that indicated the page location in the user interface 302 is replaced in the interface 500 with a vertical bar 504 that corresponds to the location of the current chapter in the visual representations 418-430 and that traverses the visual representations 418-430. For example, a width of the vertical bar 504 may be proportional to a size of the chapter (e.g., a number of pages in the chapter) relative to the overall size of the digital work (e.g., relative to a total number of pages in the digital work). Additionally, in other examples, both the vertical line 442, to indicate a location the current page, and the vertical bar 504, to indicate a location of the current chapter, may be presented in the chapter view user interface 500. For example, the vertical line 442 may be displayed as a different color than the vertical bar 504 to indicate a location of the current page within the current chapter.

In the illustrated example, a listing 506 for the object Emerald City and a corresponding visual representation 508 for the object Emerald City are visible in the chapter view user interface 500. The listing 416 for the object Kansas and the corresponding visual representation 432 for the object Kansas have not been removed from a list 510 of objects contained in chapter 15. Instead, the listing 416 for the object Kansas has merely been moved down the list 510 and is therefore no longer visible in the immediately displayed interface 500. Accordingly, the listing 416 for the object Kansas may be viewed by scrolling down the list 510 of objects using a scroll-down control 512. For example, the scroll-down control 512 may be included in the chapter view interface 500 (or the other interfaces herein) to indicate that additional objects may be viewed by scrolling the list 510.

In the illustrated example of the chapter view for chapter 15, the all items button 450 indicates that there are 45 total objects listed in the list 510, with eleven of those objects being characters, as indicated by the character button 452; three of the objects being places as indicated by the places button 454; seven of the objects being things, as indicated by a things button 514; five of the objects being interactions, as indicated by an interactions button 516; one of the objects being an organization, as indicated by an organizations button 518; four of the objects being relationships, as indicated by a relationships button 520; one of the objects being a popular highlight, as indicated by a popular highlights button 522; two of the objects being scenes, as indicated by a scenes button 524; one object being a table of contents, as indicated by a table of contents button 526; one of the objects being an event, as indicated by an events button 528; and nine of the objects being phrases, as indicated by a phrases button 530. For example, if the user just wanted to see the phrase objects included in chapter 15, the user may select the phrases button 530. As a result of selecting the phrases button 530, the interface 500 may update the list 510 to be populated with just listings and corresponding visual representations for the nine phrase objects that are included in chapter 15 of the digital work 104.

As mentioned above, the digital work provider may decide which portions of a digital work to select as an object within the digital work 104. Accordingly, the types of objects made available through the interfaces herein are not limited to the specific examples provided but may encompass any aspect of a digital work that may be of interest to a person that accesses or consumes the digital work. For example, the digital work provider may use various automated techniques for deciding which portion of a digital work to make selectable and available through the interfaces herein. Thus, a set of object buttons 532 presented below the header 466 may indicate to the user the types or categories of objects in the currently selected chapter.

In the illustrated example, the main characters in the digital work 104 are made selectable. For example, a user may wish to refer to various locations at which the main characters occur. The digital work provider may use automated techniques to identify the main characters in a digital work, such as by parsing the digital work to identify proper names, or the like, that occur in the digital work. In some instances, the digital work provider may use statistical analysis techniques to identify which characters play a significant role in a digital work. The digital work provider may also refer to various other sources when identifying the main characters in a digital work, such as by referring to various data stores and/or online sources of information (e.g., Internet movie database (IMDb®), Wikipedia®, Shelfari®, online dictionaries, encyclopedias, discussion forums, and various other sources of information). Thus, cross-referencing the proper names identified in the digital work with other sources of information may improve the accuracy of automatically identifying characters in a digital work. Additionally, with respect to the other object types, the digital work provider may use similar techniques to identify significant places mentioned in a digital work; locations in the digital work of interactions between the characters; organizations mentioned in the digital work; relationships between particular characters in the digital work; popular highlights in the digital work (e.g., portions or highlights of the digital work that are discussed frequently in online sources, online forums, social networking sites, and so forth); identifiable scenes from the digital work; identifiable events in the digital work; and identifiable phrases (e.g., statistically improbable phrases that occur in the digital work), as several non-limiting examples of objects that may be identified by the digital work provider. In addition, the foregoing examples are non-exhaustive and numerous other types of objects may be identified in digital works, such as themes, time periods, timelines, genres, and parental ratings, to name a few. Further, the types or categories of objects may vary from work to work. For example, works of non-fiction generally would not include "characters," but instead "people" or some other category might be provided. Accordingly, implementations herein are not limited to particular types or categories of objects.

The user may navigate the chapter view interface 500 from the current chapter to another chapter using the left arrow button 446 or the right arrow button 448. Accordingly, the user may tap on the left arrow button 446 once to navigate the interface 500 from the chapter view of chapter 15 to a chapter view of chapter 14. The vertical bar 504 may move to the left to correspond to the location of the selected chapter and the object buttons 532 and the list 510 of objects would change to correspond to the objects referenced in chapter 14. Additionally, in some implementations, rather than using the left and right arrow buttons 446, 448 respectively, the user may select and slide the vertical bar 504 to the desired chapter.

Figure 6:
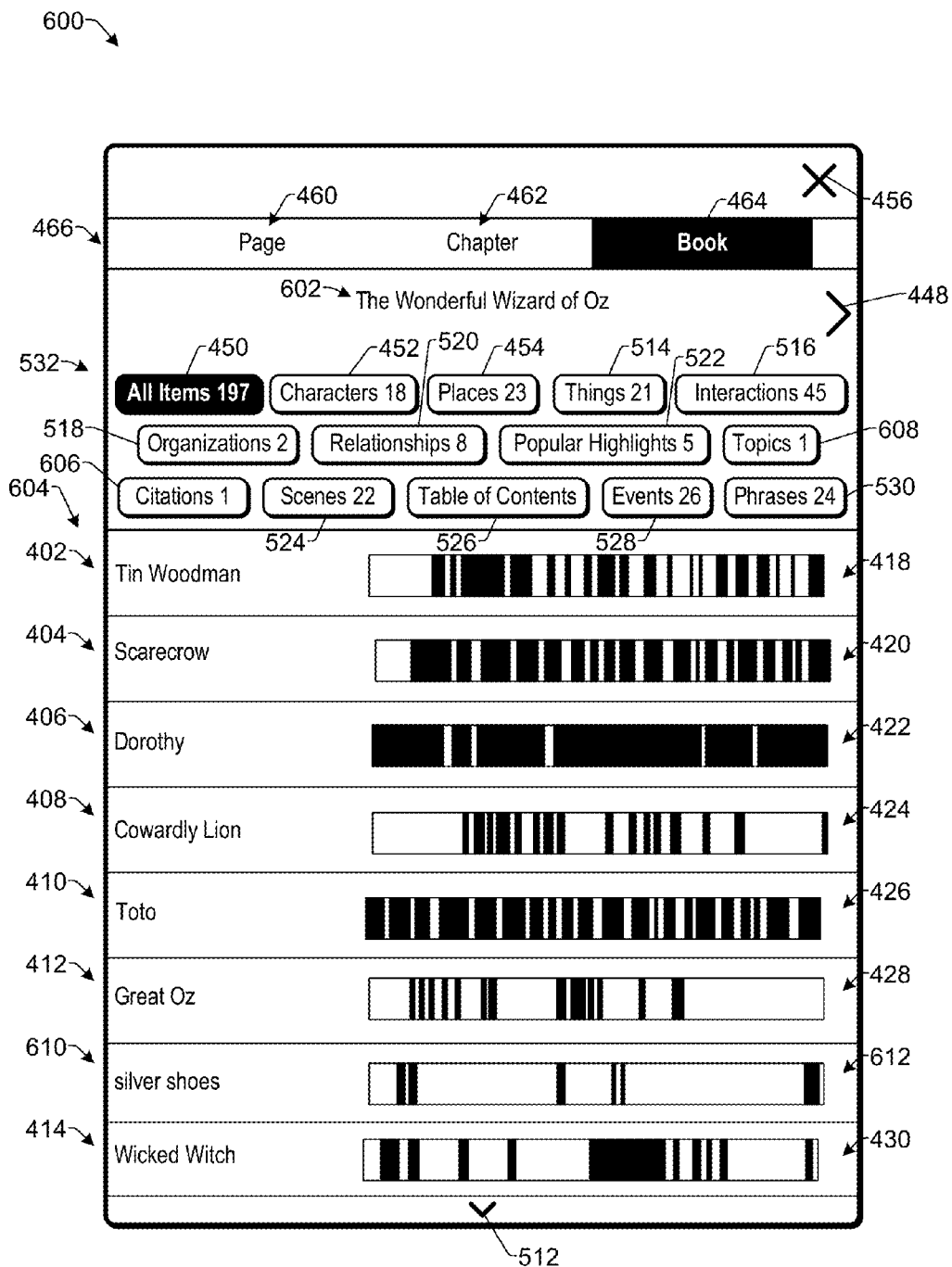
FIG. 6 illustrates an example interface for providing supplemental information, depicting a book view user interface according to some implementations.

FIG. 6 illustrates an example user book view interface 600 that may be presented when the user selects the book view from either the user interface 302 or the user interface 500 according to some implementations. For example, from either the interface 302 or the interface 500, the user may select the word "book" 464 in the header 466 to cause the electronic device 100 to render the book view interface 600. In the book view interface 600, the header 466 may indicate that the view presented is a book view. As several non-limiting examples, the word "book" 464 may be bolded, outlined, enlarged, or otherwise highlighted, etc., a marker or pointer may be placed beneath or above the word "book" 464, or other suitable indicator may be displayed to indicate that the current view is the book view. In addition, the title 602 of the digital work may be displayed underneath the header 466 rather than the chapter number or page number.

The book view may provide a listing 604 of all objects referenced in the digital work 104 when the all items button 450 is selected. In the illustrated example, the all items button 450 indicates that there are 197 total objects identified in the digital work 104. Accordingly, the user may use the scroll down control 512 to scroll through the objects in the listing 604. Alternatively, the user may select a particular one of the object buttons in the set of object buttons 532 to view a particular category of objects. Further, one or more additional object buttons may also be included below the header 466 that were not included in the chapter view or page view, depending on the objects referenced in the digital work 104. In this example, a citations button 606 indicates that one citation listing is included in the digital work, while a topic button 608 indicates that one topic is included in the digital work 104. As mentioned above, the objects referenced in a digital work identified as of interested are not limited to the examples provided herein.

In this example, a listing 610 for the phrase silver shoes and a corresponding visual representation 612 is included as one of the 24 phrases included in the listing 604 of objects. Accordingly, the visual representation 612 for the object silver shoes shows the occurrence of the phrase silver shoes in the digital work 104. The Emerald City listing 506 is still included in the listing 604 of all objects referenced in the digital work 104. Accordingly, while the Emerald City listing 506 is not visible in the current view of the book view interface 600, the Emerald City listing 506 may be accessed by using the scroll down control 512.

Figure 7:
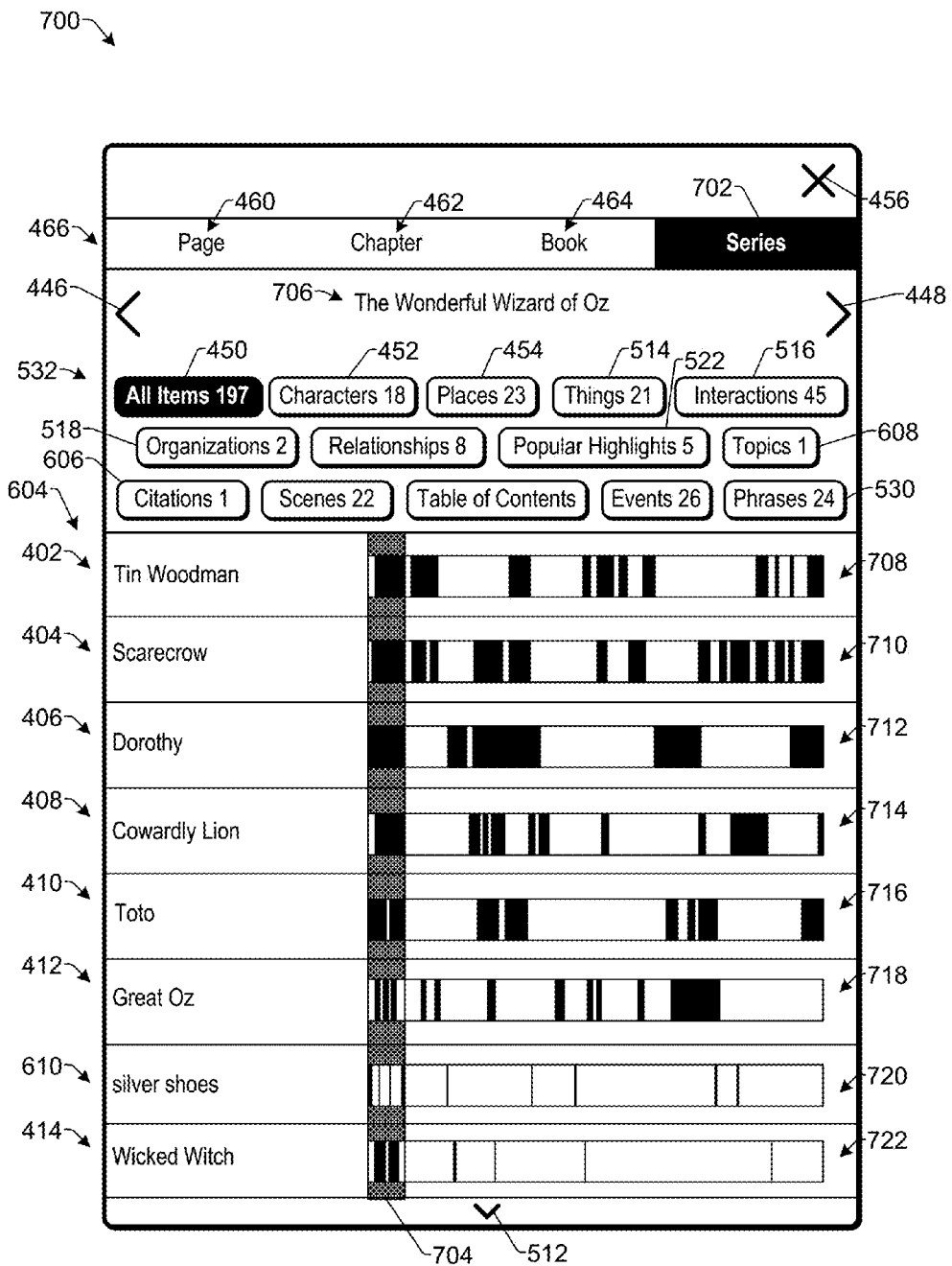
FIG. 7 illustrates an example interface for providing supplemental information, depicting a series view user interface according to some implementations.

FIG. 7 illustrates an example user interface 700 that may be presented when the user elects to access a series view from the user interface 600 according to some implementations. For instance, in the case that the digital work 104 is part of a series of books, from the user interface 600 in FIG. 6, the user may tap or otherwise select the right direction arrow 448 to navigate to a series view, as illustrated in FIG. 7. Accordingly, the header 466 may now include a word "series" 702. As several non-limiting examples, the word "series" 702 may be highlighted, outlined, bolded, enlarged, etc., a marker or pointer may be placed beneath or above the word "series" 702, or other suitable indicator may be displayed to indicate that the series view is being presented. Alternatively, in some implementations, when the book is part of a series, the word "series" 702 may be included in the header 466 from the outset such as included in the interfaces 302, 500 and 600 to enable a user to directly access the series view interface 700.

The series view interface 700 may include a vertical bar 704 that indicates a current digital work in the series from among a plurality of digital works in the series represented by the interface 700. Accordingly, similar to the chapter view vertical bar 504 described above, the user may move the vertical bar 704 such as by using the right direction arrow 448 or the left direction arrow 446, by sliding, or the like. Accordingly, as the vertical bar 704 moves from one book to the next book in the series, a title 706 displayed underneath the header 466 may change to show the name of the book currently displayed in the series view user interface 700.

In addition, the visual representations for each listing in the series view user interface 700 now represent the occurrences of the corresponding listed objects in the series of books, rather than in a single book. For example, a visual representation 708 for the object Tin Woodman now shows the occurrences of the object Tin Woodman throughout the series of the Oz books, indicating that the object Tin Woodman may not be present in some of the books while playing a substantial role in others of the books in the series. Similarly, a series visual representation 710 shows occurrences of the object scarecrow in the series; a series visual representation 712 shows occurrences of the object Dorothy in the series; a series visual representation 714 shows occurrences of the object cowardly lion in the series; a series visual representation 716 shows occurrences of the object Toto in the series; a series representation 718 shows occurrences of the object Great Oz in the series; a series visual representation 720 shows occurrences of the object "silver shoes" in the series; and a series visual representation 722 shows occurrences of the object Wicked Witch in the series. Accordingly, it is possible to determine the role played by each of these characters or other objects throughout the entire series of books based on the view provided by the series view interface 700. Consequently, through the series view, a user may determine which books to read if the user is interested in reading further about a particular character or the like. Additionally, in some implementations, when the user has navigated to a different book in the series using the series view interface 700, the user may select the book view from the series interface to view the book view interface for the different book.

Figure 8:
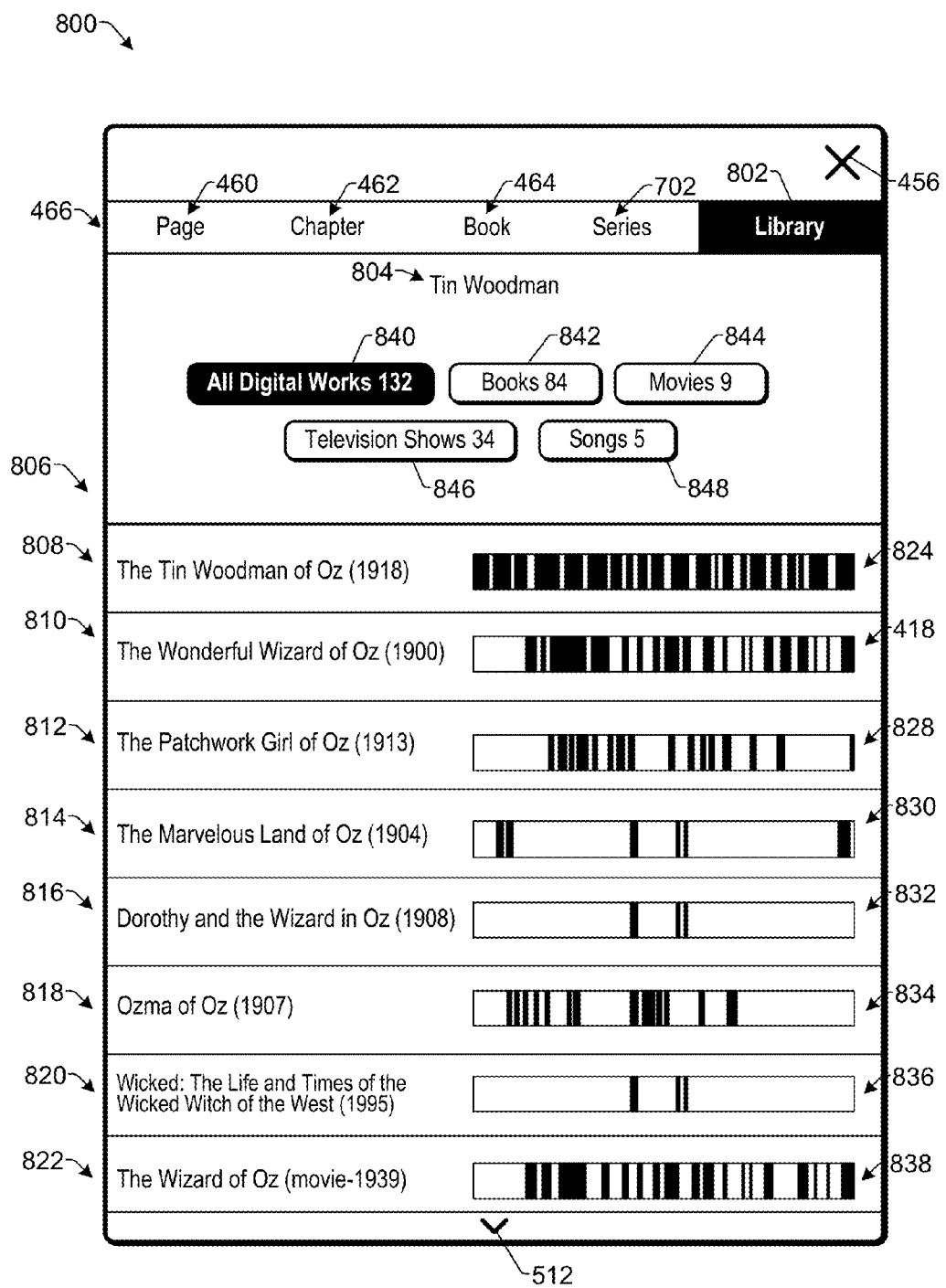
FIG. 8 illustrates an example interface for providing supplemental information, depicting a library view interface according to some implementations.

FIG. 8 illustrates an example library view interface 800 that may be presented when the user elects to access a library view, such as from the user interface 700 according to some implementations. For instance, as one example, in the series view interface 700, the user may navigate to the last book in the series using the right direction arrow 448. A subsequent navigation to the right may generate the library view interface 800. Accordingly, in this example, the header 466 may now include a word "library" 802. As several non-limiting examples, the word "library" 802 may be highlighted, outlined, bolded, enlarged, etc., a marker or pointer may be placed beneath or above the word "library" 802, or other suitable indicators may be displayed to indicate that the library view is being presented. Alternatively, in some implementations, when the library view will be available, the word "library" 802 may be included in the header 466 from the outset, such as included in the interfaces 302, 500, 600 and 700 to enable a user to directly access the library view interface 800 from any of the interfaces 302, 500, 600 or 700.

In the example of FIG. 8, the library view interface 800 is presented for the object 804, the Tin Woodman in this example. Accordingly, the object Tin Woodman 804 is listed below the header 466. Furthermore, unlike the previous user interfaces 302, 500, 600 and 700 described above, the library view interface 800 is directed to the occurrence of the object Tin Woodman in a plurality of digital works contained in the library, and provides a listing of the titles of digital works in the library that include one or more occurrences of the object Tin Woodman.

In some implementations, the library of digital works used to generate the library view interface 800 may be limited to the digital works contained on the electronic device 100 (e.g., in a library of digital works stored on the electronic device 100). In other implementations, the library used to generate the library view interface 800 may extend to some or all of the digital works maintained by the digital work provider (e.g., in a library of digital works of the digital work provider). In still other implementations, the library view may be selectable, providing a user with a view for digital works contained on the device or a view for all digital works maintained by the digital work provider.

In the illustrated example, the library view interface 800 includes a listing 806 of titles of digital works and corresponding visual representations of occurrences of the object Tin Woodman 804 in the digital works listed. Thus, the listing 806 of digital works includes a listing 808 for *The Tin Woodman of Oz* published in 1918; a listing 810 for *The Wonderful Wizard of Oz* published in 1900; a listing 812 for *The Patchwork Girl of Oz* published in 1913; a listing 814 for *The Marvelous Land of Oz* published in 1904; a listing 816 for *Dorothy and the Wizard in Oz* published in 1908; a listing 818 for *Ozma of Oz* published in 1907; a listing 820 for *Wicked; The Life and Times of the Wicked Witch Of the West*, published in 1995; and a listing 822 for *The Wizard of Oz*, the movie released in 1939.

Furthermore, the visual representation associated with each listed digital work may represent the occurrences of the object Tin Woodman in that digital work. For example, the visual representation 418 for the object Tin Woodman corresponding to the listing 810 *The Wonderful Wizard of Oz* is the same as that shown above with respect to interfaces 302, 500 and 600. Furthermore, a visual representation 824 shows occurrences of the object Tin Woodman in *The Tin Woodman of Oz*; a visual representation 828 shows occurrences of the object Tin Woodman in the Patchwork Girl of Oz; a visual representation 830 shows occurrences of the object Tin Woodman in *The Marvelous Land of Oz*; a visual representation 832 shows occurrences of the object Tin Woodman in *Dorothy and the Wizard in Oz*; a visual representation 834 shows occurrences of the object Tin Woodman in *Ozma of Oz*; a visual representation 836 shows occurrences of the object Tin Woodman in a more recently published digital work entitled *Wicked; The Life and Times of the Wicked Witch Of the West*, and a visual representation 838 shows occurrences of the object Tin Woodman in the movie *The Wizard of Oz* released in 1939. For example, the occurrences of the object Tin Woodman in the movie version of *The Wizard of Oz* may be determined based on a corresponding screenplay, analysis of the close captioning content for the movie, image recognition, facial recognition and/or voice-to-text recognition performed directly on the movie, and so forth.

Furthermore, the object buttons listed below the header 466 may also be different in the library view interface 800 from those described above in the interfaces 302, 500, 600 and 700. For example, an "all digital works" button 840 shows in this example that the library contains 132 digital works that have at least one occurrence of the object Tin Woodman. For example, a digital work that includes only one occurrence of the object Tin Woodman in the digital work, such as in a conversation in an otherwise unrelated book, may be included in the listing 806 of digital works. Accordingly, in some implementations, the digital works in the listing 806 as may be ranked according to a relevance to the object 804. For example, the digital works may be listed in an order based at least in part on a frequency of occurrence of the object 804 in the digital work. Other factors may also be taken into consideration such as the author of each of the digital works, the time period of the digital works, the type of digital work, and other information about the digital works.

In addition to the "all digital works" button 840, the library view interface may include a books button 842, which shows that there are 84 books in the library that include at least one occurrence of the object Tin Woodman; a movies button 844, which shows that there are 9 movies in the library that include at least one occurrence of the object Tin Woodman; a television show button 846, which shows that there are 34 television shows in the library that include at least one occurrence of the object Tin Woodman; and a songs button 848, which shows that there are 5 songs within the library that include at least one occurrence of the object Tin Woodman. For example, with respect to the songs, the digital work provider may analyze the lyrics of the songs to detect one or more occurrences of the object Tin Woodman. As with the other interfaces discussed above, if the user wishes to view only the movies that include an occurrence of the object Tin Woodman, the user may select the movie button 844. Similarly, the user may view just the books by selecting the book button 842, just the television shows by selecting the television show button 846, and just the songs by selecting the song button 848.

Figure 9:
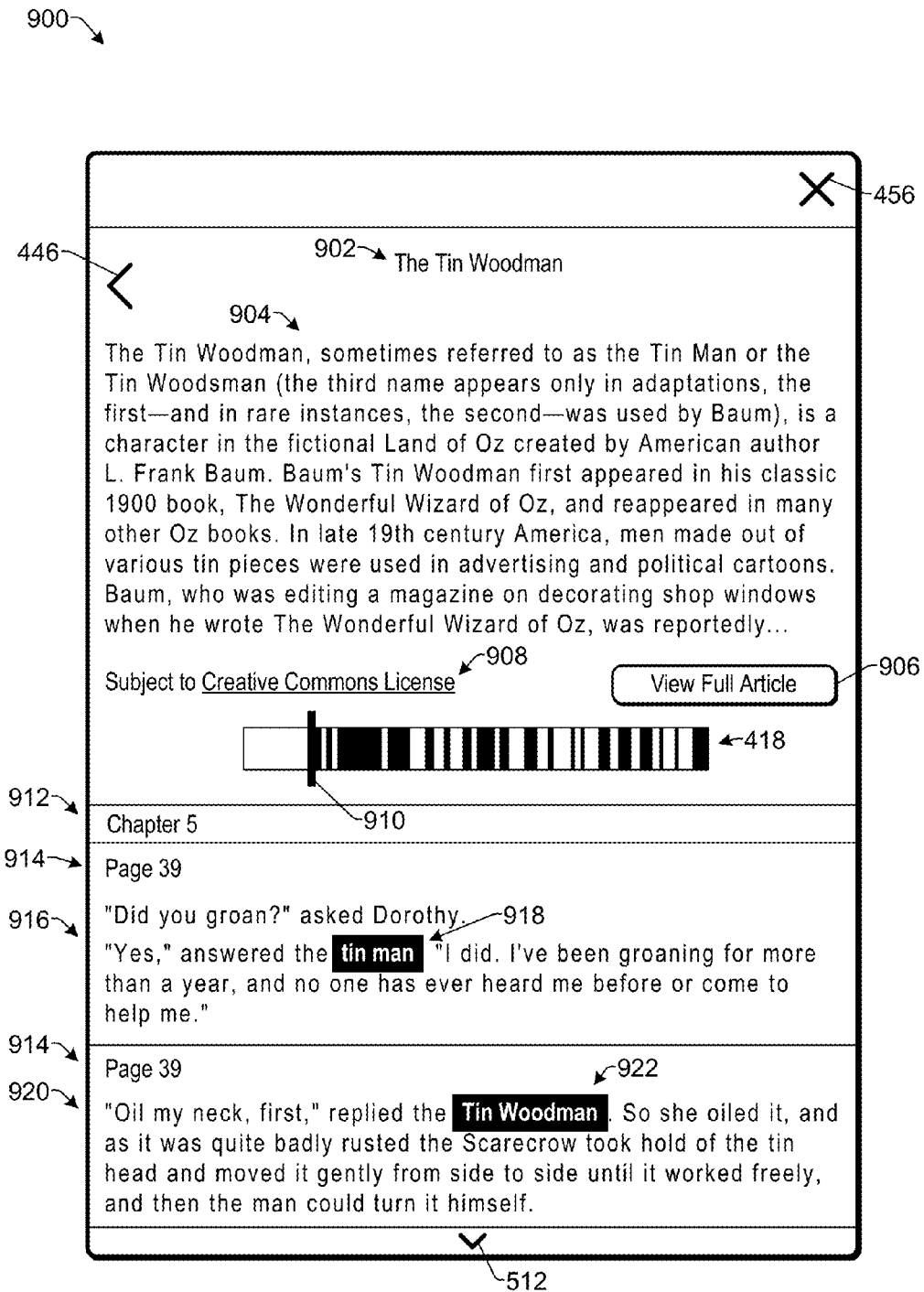
FIG. 9 illustrates an example interface for providing supplemental information, depicting a supplemental content view interface according to some implementations.

FIG. 9 illustrates a supplemental information view user interface 900 that the user may navigate to, such as from the user interface 302 discussed above with respect to FIG. 4, or from the other user interfaces 500, 600, 700 or 800. For example, from the interface 302, the user may select the object Tin Woodman, such as by tapping, double clicking, etc., and be presented with the supplemental information view user interface 900. The supplemental information view user interface 900 includes the name of the object 902, and may include prestored content 904 obtained in advance from an authoritative source and provided by the digital work provider as part of the supplemental information provided for the corresponding digital work 104. Several non-limiting examples of sources from which the prestored content may be obtained include online sources, such as Wikipedia®, Shelfari® and IMDb®, as well as other encyclopedias, reference books, websites, and the like, depending on the subject matter of the digital work being analyzed and supplemented.

Accordingly, the digital work provider may obtain a limited amount of information about the object 902, such as an excerpt from an online source, to provide as prestored content 904 with the supplemental information for a particular digital work. The digital work provider may also provide a link 906 to the full article at an online source to enable the user to access additional information on the object 902 if the user so desires and currently has network access. Accordingly, the user may view the full article on the object 902 by selecting the link 906 or the like. Additionally, the digital work provider may include a link 908 to license information on the prestored content.

In other implementations, as an alternative to displaying the prestored content 904, the supplemental information view interface 900 may instead display one or more links to online sources of information about the selected object. In some examples, no prestored content 904 is included with the supplemental information and instead the supplemental information may include one or more links or reference identifiers for sources of information or content about the selected object. For example, each displayed link may be selected by a user to access a network accessible resource that provides information about the selected object, such as descriptive text, an image, an audio clip, a video clip, and so forth. As another example, when the supplemental information view user interface 900 is accessed, a module on the electronic device 100 (e.g., a supplemental information display module, as described below) may access information from a network accessible resource to obtain and automatically display the information about the selected object in the supplemental information view user interface 900. Thus, rather than relying on prestored content, the supplemental information view user interface 900 may dynamically display content about the selected object retrieved from an online source. For example, the content may be retrieved from any of the online sources discussed above, from the digital work provider, or various other network accessible resources, either automatically or in response to a user selection of a displayed reference identifier (i.e., a link, a URL), or selection of a button or control that causes access to the network accessible resources. These implementations may reduce the frequency of updates to the prestored content since the latest content on information about the selected object will be obtained when the supplemental information view user interface 900 is accessed. In some cases, however, updates to the reference identifiers that link to the network accessible resources may be still be made, such as when a URL changes, or if additional sources of information about the object become available.

Furthermore, the supplemental information view user interface 900 may also provide the visual representation 418 corresponding to the object 902, and which may include a slider 910 in a position that corresponds to text from one or more excerpts from the book listed below the visual representation 418. For example, the supplemental information view user interface 900 may provide the chapter 912 and page number 914 for each excerpt from the text of the digital work 104. Accordingly, when the slider 910 is positioned at the beginning of the visual representation 418, such as at the leftmost marking, a first excerpt 916 may include the first occurrence of the object Tin Woodman in the digital work, and may highlight the occurrence in the excerpt as indicated at 918. Similarly, the second excerpt 920 may include the second occurrence of the object Tin Woodman in the digital work and may highlight the occurrence in the excerpt, as indicated at 922. Accordingly, the user may scroll down using the scroll down control 512 to view additional excerpts corresponding to the current location of the slider 910. Further, the user may select and slide the slider left or right along the visual representation 418 to view other excerpts from the book having occurrences of the object Tin Woodman therein. Furthermore, the user may select the left arrow 446 to return to the previous user interface such as the page view user interface 302 described above.

Figure 10:
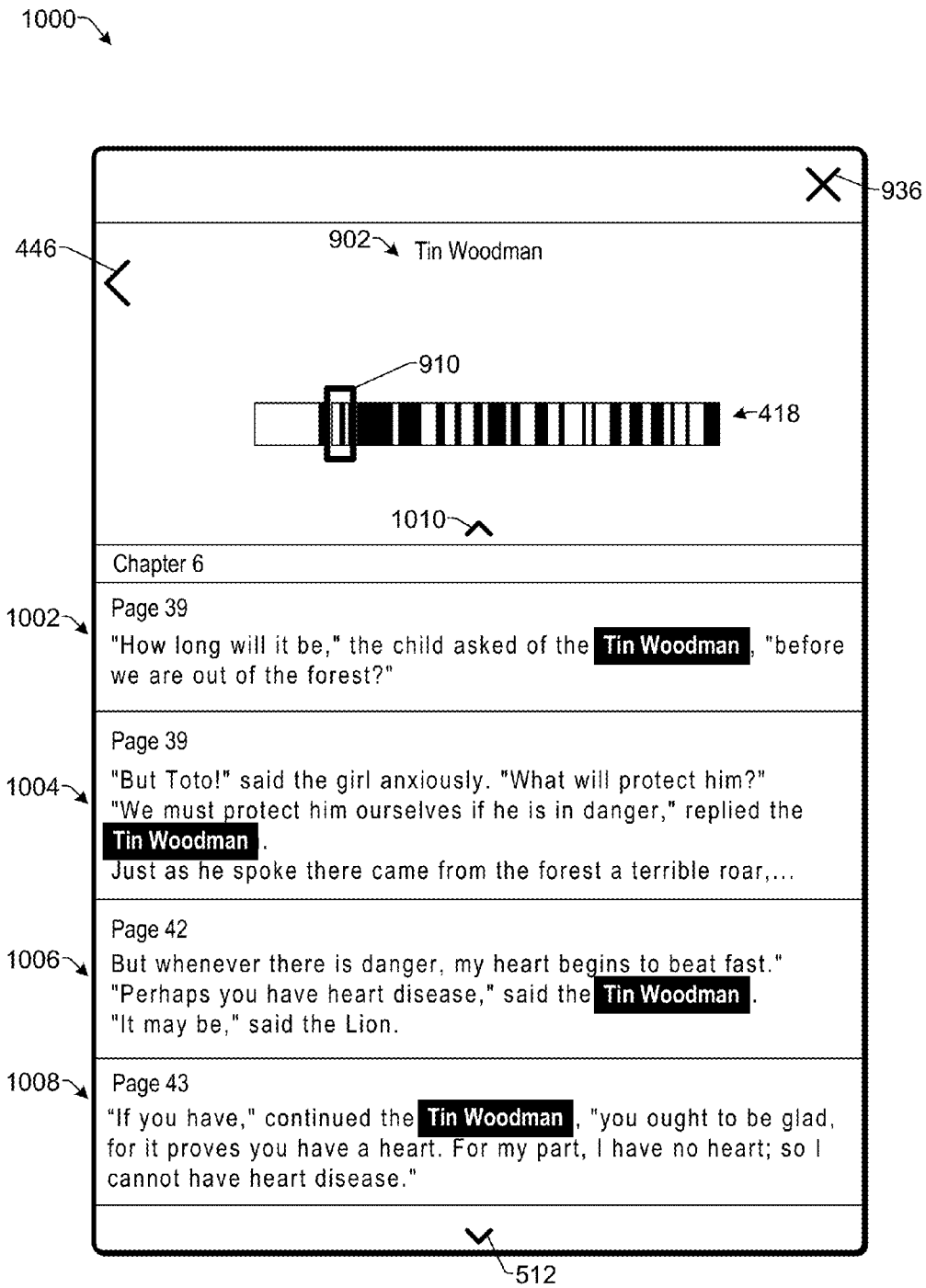
FIG. 10 illustrates an example interface for providing supplemental information, depicting a supplemental information view user interface according to some implementations.

FIG. 10 illustrates another example of supplemental information view user interface 1000 in which there is no prestored content for the object 902 (or the user has closed the prestored content for the object 902). In this example, the slider 910 can be seen to have changed size from the previous example for instance, the slider 910 may change size based upon the locations of the excerpts currently shown in the supplemental information view user interface 1000 in relation to the visual representation 418. In this example, a first excerpt 1002, a second excerpt 1004, a third excerpt 1006, and a fourth excerpt 1008 are presented in the supplemental information view user interface 1000, spanning pages 39 through 43. Thus, the slider 910 may elongate or contract in the direction of sliding left or right depending on the locations of the excerpts displayed in the supplemental information view user interface 1000 and corresponding to the current slider location on the visual representation 418. Furthermore, a scroll-up arrow 1010 may be included in addition to the scroll-down control 512, to enable the user to scroll between various excerpts of the text of the digital work 104. The slider 910 may move along the visual representation 418 in accordance with the scrolling.

Figure 11:
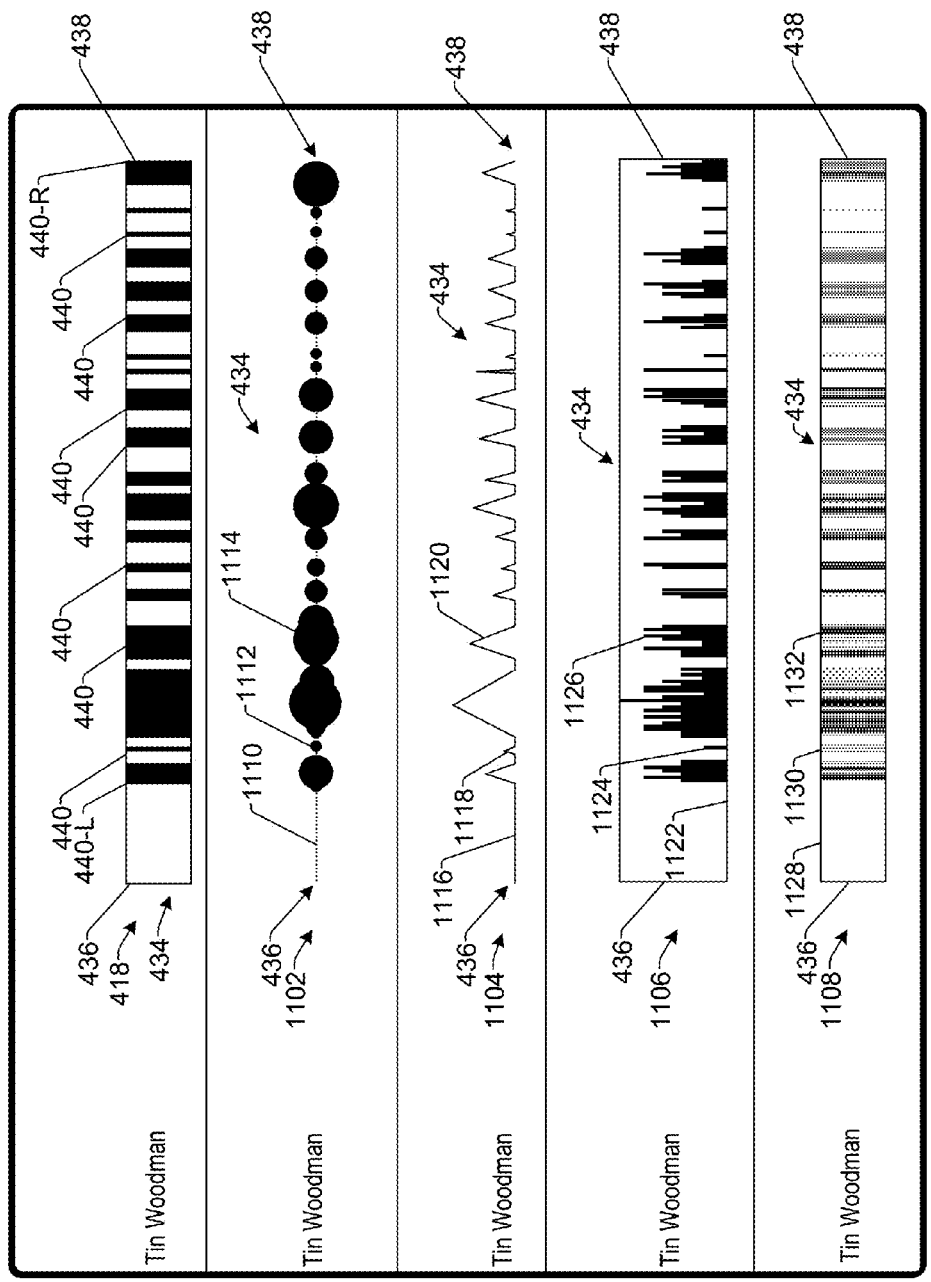
FIG. 11 illustrates various alternative examples of supplemental information visual representations according to some implementations.

FIG. 11 illustrates several examples of alternative configurations of visual representations according to some implementations herein. In the illustrated example, the visual representation 418 for the object Tin Woodman is depicted for comparison purposes to enable comparison with the example alternative configurations. A first example alternative configuration is a circular indicator graph 1102; a second example alternative configuration is a spark line graph 1104; a third example alternative configuration is a histogram 1106; and a fourth example alternative configuration is a heat map 1108.

The circular indicator graph 1102 includes a plurality of circular indicator markings that indicate locations and frequency of occurrences of the object Tin Woodman in the digital work 104. In this example, a plurality of small circles or dots 1110 may provide a baseline indication that there are no occurrences of the selected object at that location in the digital work. Accordingly, the dots 1110 may extend across the area 434 from the first side 436 to the second side 438. In some examples, each dot 1110 may correspond to one page in the digital work if the resolution of the display 102 enables such a representation. Further, a first marking or first circular indicator 1112 may be of a first diameter corresponding to a single occurrence of the object Tin Woodman on a single page of the digital work 104. A second marking or a second circular indicator 1114 may be, e.g., four times the diameter of the first circular indicator 1112 to indicate that there are four occurrences of the object Tin Woodman on the page of the digital work 104 corresponding to the location of the second indicator 1114. Consequently, a circular indicator may be provided for each page, and may be of a diameter corresponding to a number of instances or occurrences of the object on that page, with adjacent circular indicators larger than the baseline dots 1110 overlapping. Additionally, in other implementations, there is no overlap between the circular indicators. Further, in other examples, the dots and circular indicators may correspond to location number assigned to the parts of the digital work or ranges of location numbers, as discussed above.

The sparkline graph 1104 may also serve to provide an indication of frequency of occurrence an object in separate portions of the book. In some implementations, the sparkline graph 1104 may extend across the area 434 from the first side 436 to the second side 438. The sparkline graph 1104 may include a baseline 1116 that indicates that there are no occurrences of the object in a corresponding area of the digital work 104. The sparkline graph 1104 may further include markings that appear as peaks that indicate a location of at least one occurrence of the object in the digital work. The altitude of the peaks of the sparkline graph 1104 may indicate a maximum number of occurrences of the object in a particular portion of the digital work 104. For example, a first peak 1118 may be a first altitude where there is only a single occurrence of the object at that location in the digital work, while a second peak 1120 may be of a substantially higher altitude when there are a number of instances of the object in the digital work at that portion of the digital work. For example, if the maximum number of occurrences in the area of the second peak 1120 is four occurrences, the second peak 1120 may be four times as high as the first peak 1118.

The histogram 1106 may include a plurality of markings that are bars or other suitable shapes, the height of which indicates a number of occurrences of the object at a particular location in the digital work 104. For example, if the resolution of the display 102 is sufficient, the histogram 1106 may include a bar corresponding to each page of the digital work 104. Thus, the histogram 1106 may include a baseline 1122 for pages at which there are no occurrences of the object. Further, a first bar 1124 may have a first height corresponding to a single occurrence of the selected object on a particular page of the digital work 104, while a second bar 1126 may be, e.g., four times the height of the first bar 1124 to indicate that there are four occurrences of the object at that page of the digital work 104, and so forth. In some examples, each bar may have a width corresponding to a single page of the digital work such that the area 434 has a width or expanse corresponding to a total number of pages in the digital work. Additionally, in other implementations, each bar of the histogram 1106 may correspond to multiple pages or multiple locations in a digital work.

The heat map 1108 may include markings that appear in grayscale or color, and may indicate through differences in shade or color how many occurrences of the object are at a particular location in the digital work 104. For example, the heat map 1108 may include a first shade or color at a location where there are no occurrences of the object. Further, in some examples, the heat map 1108 may get progressively darker or progressively lighter as there are more occurrences of the object at particular locations in the digital work 104. For example, in the case that the heat map 1108 is grayscale, a marking at a first location 1130 at which there is only a single occurrence of the object, may have a shade that is only slightly different from the baseline 1128, while a marking at a second location 1132, at which there are multiple occurrences of the object, may have a shade that is substantially different from the baseline 1128, i.e., substantially darker or substantially lighter. Alternatively, in other examples the markings of the heat map 1108 may vary in color progressively from one color to another color based on the number of occurrences of the object at particular locations in the digital work corresponding to the markings.

Furthermore, the visual representations described herein are only several non-limiting illustrative examples of representations that may be employed to provide supplemental information to users. Numerous variations in the types of representations provided, various shapes and graph types used to generate the representations, whether the representations are in color or monotone, and so forth will be apparent to those of skill in the art in view of the disclosure herein.

Figure 12:
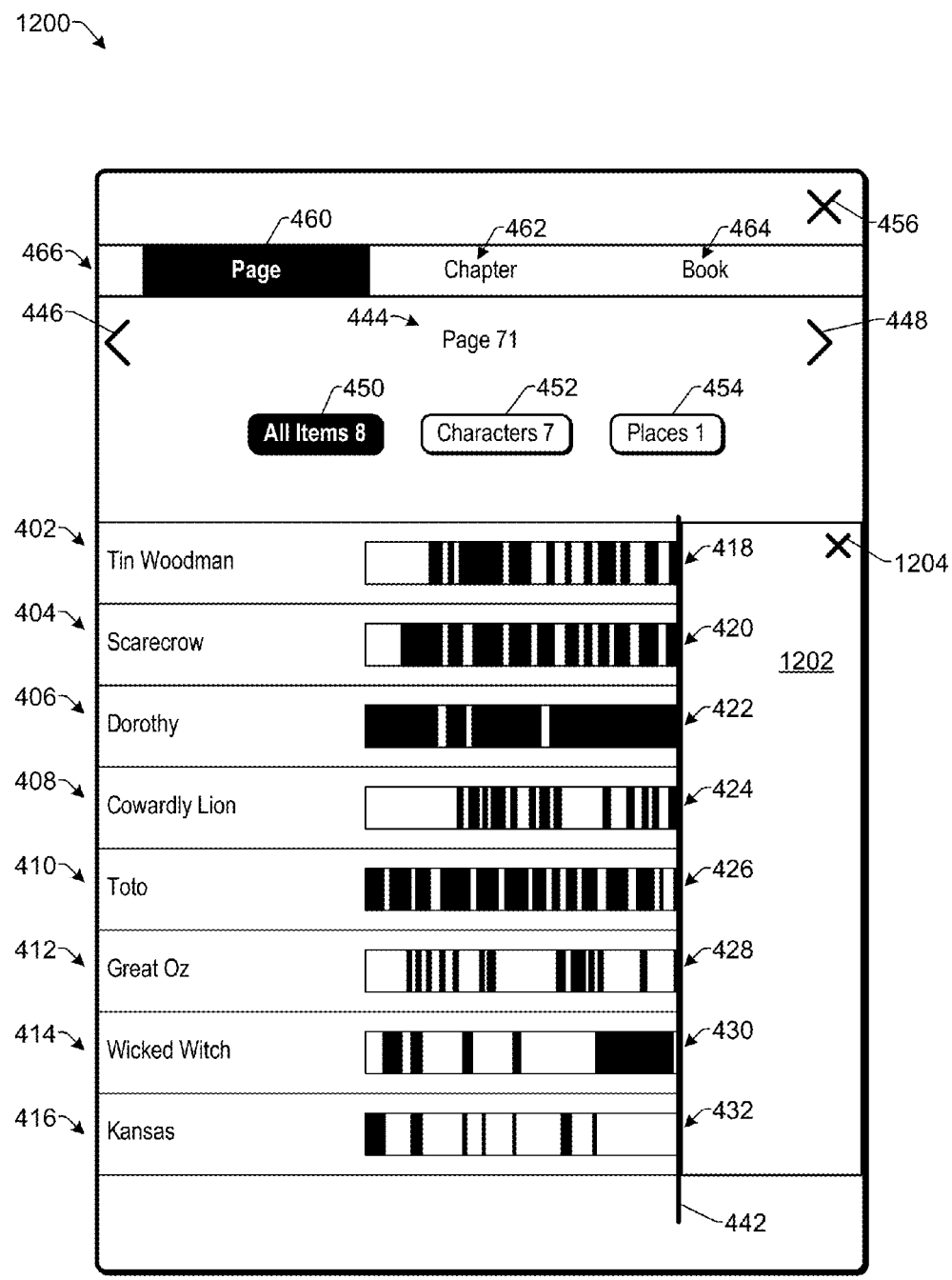
FIG. 12 illustrates an example interface for providing supplemental information, depicting a page view user interface with a spoiler curtain according to some implementations.

FIG. 12 illustrates an example user interface 1200 that may correspond to the user interface 302 in the illustrated example, or to other interfaces herein in other examples. The user interface 1200 includes a spoiler screen or spoiler curtain 1202, which may be included overtop of a portion of the visual representations displayed in the user interfaces herein, such as user interfaces 302, 500, 600, 700, 800, 900, 1000 and so forth. Thus, the spoiler curtain 1202 is an opaque screen that conceals at least a portion of the visual representations. For example, in the case of fiction works, the visual representations may provide an indication of interactions between characters in the digital work, the fate of characters, and the like. For example, by viewing the visual representations 418-432 it may be possible to determine whether characters are still in the digital work at the end of the digital work, which characters interact with each other at the end of the digital work, which things are present at the end of the digital work, which locations are of importance at the end of the digital work, and so forth, which may spoil the reader's enjoyment of the digital work by prematurely indicating the outcome of the story or the like. Accordingly, the spoiler curtain 1202 may be displayed overtop of the visual representations 418-432 starting at the current location that the user has reached in the digital work and extending to the end of the digital work. Thus, the spoiler curtain 1202 hides the occurrences of characters, things, places, etc., and/or interactions between characters, things, places, and so forth in the digital work beyond the point at which the reader has already reached. In some examples, the point that the user has reached in the digital work may be indicated by the vertical line 442. Consequently, the spoiler curtain 1202 may extend from the vertical line 442 to the rightmost end of the visual representations 418-432.

Furthermore, should the user desire to view the full extent of the visual representations 418-432, the user may select a virtual control such as a window-close control 1204 to close the spoiler curtain 1202. Closing the spoiler curtain 1202 will result in revealing the hidden portions of the visual representations 418-432, as shown e.g., in the page view of the user interface 302, as discussed above with respect to FIG. 4. Accordingly, the spoiler curtain 1202 may be employed any time that the supplemental information interfaces herein may provide an indication to a user of future events or interactions in the digital work. Further, while the spoiler curtain 1202 may be applied frequently in the case of fiction digital works, it is unlikely that the spoiler curtain 1202 would be needed in the case of nonfiction digital works, such as a reference digital work, a factual digital work, and so forth. Accordingly, implementations herein may be configured to automatically apply the spoiler curtain 1202 when displaying supplemental information for works identified as fiction and not apply the spoiler curtain 1202 when displaying supplemental information for digital works identified as non-fiction.

Figure 13:
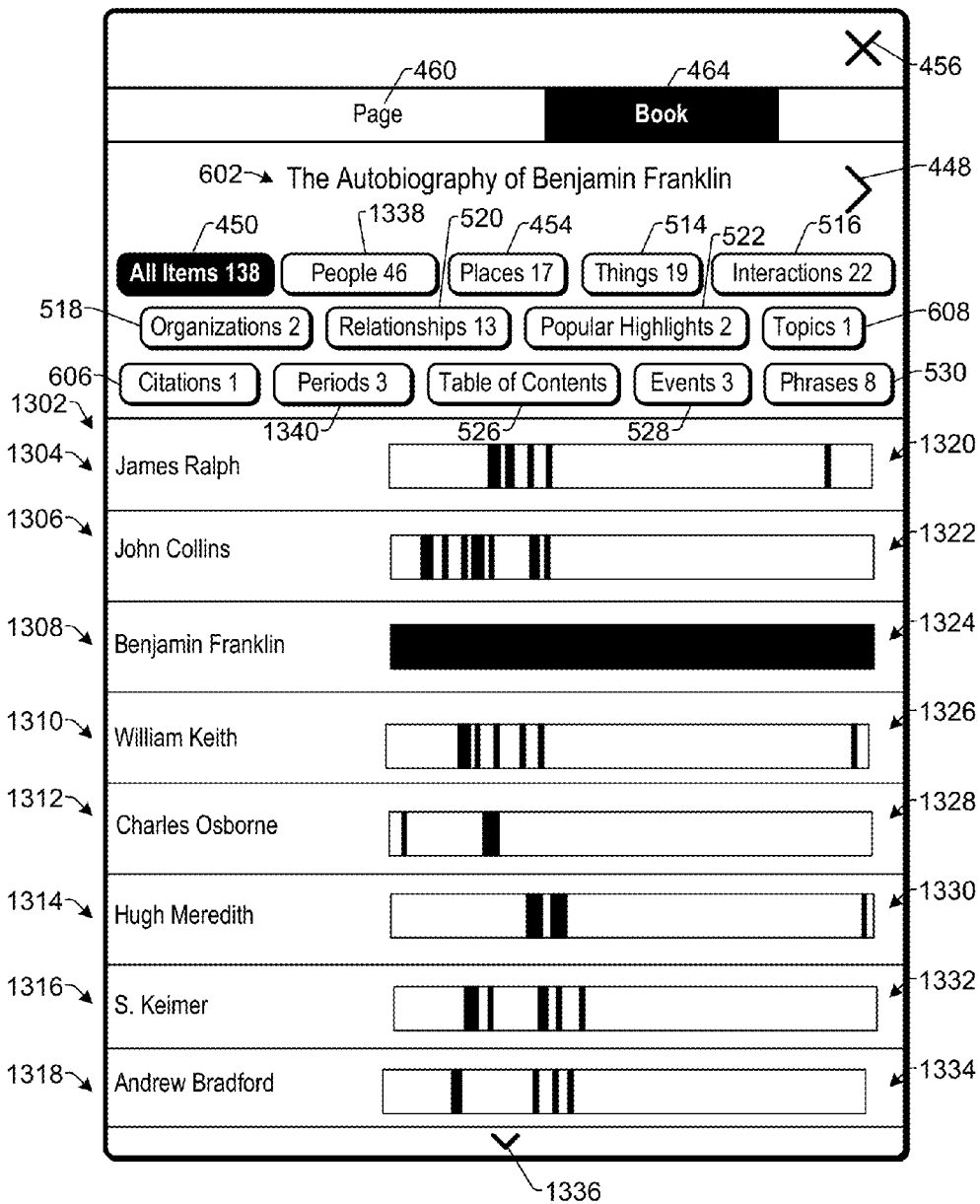
FIG. 13 illustrates an example interface for providing supplemental information, depicting a book view user interface for a non-fiction digital work according to some implementations.

FIG. 13 illustrates an example book view interface 1300 that may be presented when the user navigates to a book view while reading a non-fiction digital work according to some implementations. In this example, suppose that the user is reading *The Autobiography of Benjamin Franklin* and desires to find out more information about a person mentioned in the digital work, such as James Ralph. The user may select the name of James Ralph as an object, and navigate to the book view interface 1300 in a manner similar to that described above. The book view interface 1300 may present the user with a listing 1302 of objects and corresponding visual representations of occurrences of those objects in the digital work. In this example, the listing 1302 may include a listing 1304 for James Ralph; a listing 1306 for John Collins; a listing 1308 for Benjamin Franklin; a listing 1310 for William Keith; a listing 1312 for Charles Osborne; a listing 1314 for Hugh Meridith; a listing 1316 for S. Keimer; and a listing 1318 for Andrew Bradford. Each person listed in the listing 1302 may be listed with a corresponding visual representation showing locations of occurrences of the person's name in the digital work. For example, James Ralph may be listed with a corresponding visual representation 1320; John Collins may be listed with a corresponding visual representation 1322; Benjamin Franklin may be listed with a corresponding visual representation 1324; William Keith may be listed with a corresponding visual representation 1326; Charles Osborne may be listed with a corresponding visual representation 1328; Hugh Meridith may be listed with a corresponding visual representation 1330; S. Keimer may be listed with a corresponding visual representation 1332; and Andrew Bradford may be listed with a corresponding visual representation 1334. Thus, each corresponding visual representation 1320-1334 may visually indicate the locations of occurrences of objects in the digital work. Additionally, as noted from the object buttons provided above the listing 1302, the user may scroll down through the listing 1302 using a scroll-down control 1336 to view additional people or other objects identified in the digital work.

Further, as the digital work is a work of non-fiction, the supplemental information may differ from that associated with a work of fiction. For example, with respect to the object buttons, for a work of non-fiction, the characters button 452 may be replaced with a people button 1338 that indicates the number of people of interest occurring in the digital work. Similarly, the scenes button 524 may be replaced with a timeline or time period button 1340 that indicates various different time periods or timelines covered by the book, such as the time period prior to the American Revolution; the time period corresponding to the American Revolution; and the time period after the American Revolution. For example, a nonfiction book, such as a history book, may include a plurality of distinct or identifiable time periods, each of which may be a different time period object for which supplemental information may be provided. Furthermore, because the digital work is not part of a series, selection of the navigate right arrow 448 may result in presentation of the library view user interface for a selected object, rather than a series view, as described above.

Example Framework

Figure 14:
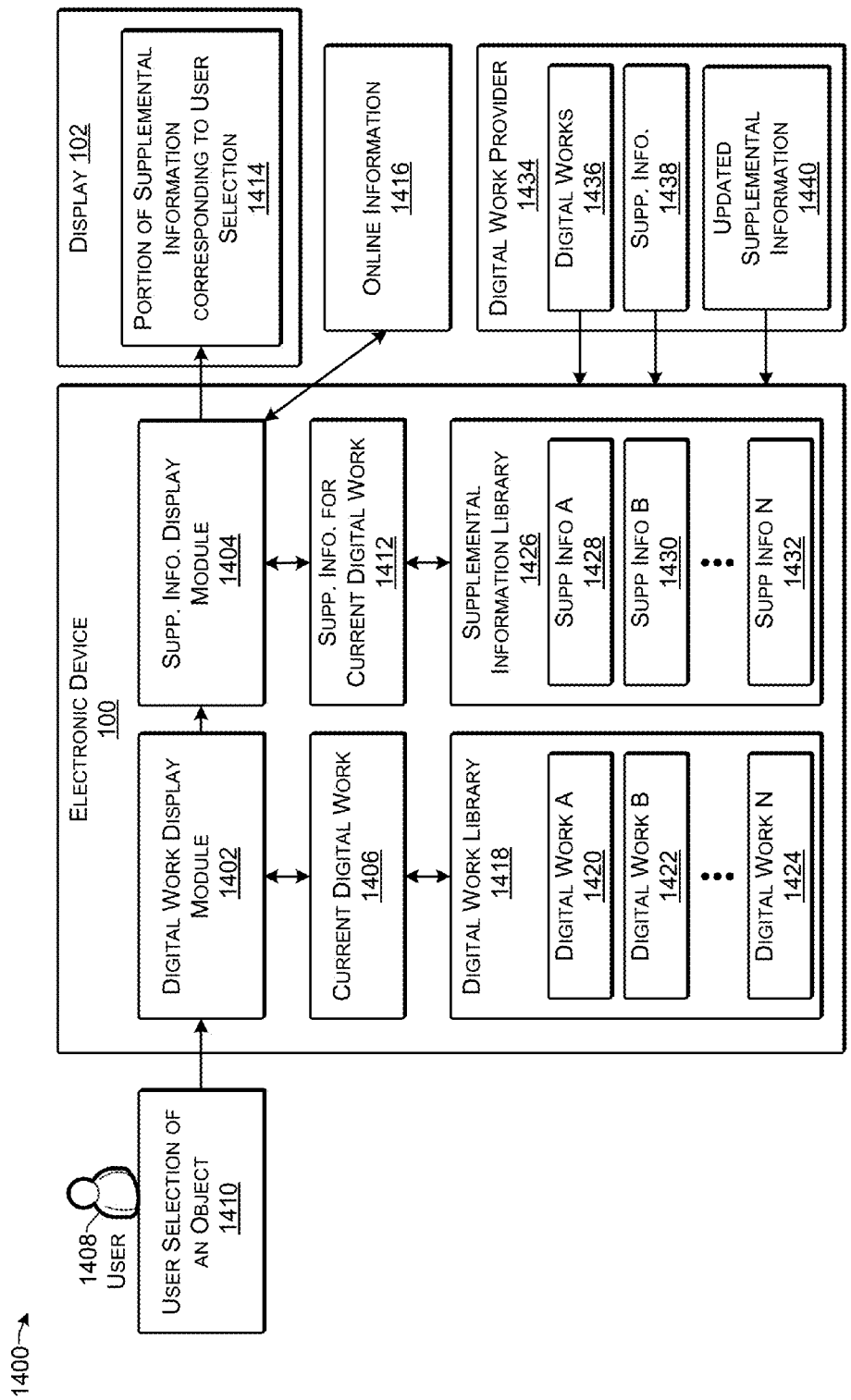
FIG. 14 illustrates an example framework for providing supplemental information according to some implementations.

FIG. 14 illustrates an example framework 1400 for displaying supplemental information in connection with a digital work according to some implementations. In the example of FIG. 14, the electronic device 100 includes a digital work display module 1402 and a supplemental information display module 1404. In some implementations, the digital work display module 1402 and the supplemental information display module 1404 may be separate modules. In other implementations, the digital work display module 1402 and the supplemental information display module 1404 may both be part of the same application or computer program for displaying content on the electronic device 100. In yet other implementations, the digital work display module 1402 and the supplemental information display module 1404 may represent different functionalities of the same module.

As one non-limiting example, the digital work display module 1402 may display a current digital work 1406 on the display 102. In some examples, as mentioned above, the display 102 may be part of the electronic device 100, and/or unitary with the electronic device 100. In other implementations, the display 102 may be separate from the electronic device 100 and connected to the electronic device 100. In either case, the digital work display module 1402 may render the current digital work 1406 on the display 102 for viewing by a user 1408.

As an example, while the digital work display module 1402 is displaying the current digital work 1406, the electronic device 100 may receive a user selection 1410 of an object displayed in the current digital work 1406, as discussed above with reference to FIG. 1. In response, in some implementations, the digital work display module 1402 may display the "view information on selection" virtual control 202 discussed above with reference to FIG. 2. Upon receiving user selection of the virtual control 202, the supplemental information display module 1404 may be executed to provide supplemental information 1412 in connection with the selected object of the current digital work 1406, such as described above with reference to the examples of FIGS. 3-13. For example, the supplemental information display module 1404 may access the supplemental information 1412 available for the current digital work 1406, and may provide at least a portion 1414 of supplemental information corresponding to the user selection to be rendered on the display 102, such as in a window, overlay, pop up, or other user interface or image displayed on the display 102.

Additionally, in some implementations, the supplemental information display module 1404 may access online information 1416 when providing the portion 1414 of supplemental information. For example, if the user 1408 requests additional information with respect to prestored content, such as by clicking on a provided link, the supplemental information display module 1404 may retrieve the online information from a network location, such as a uniform resource locator (URL), or other network location or repository. Examples of sources of such online information 1416 include, but are not limited to Wikipedia®, Shelfari®, and IMDb®, as well as numerous other online sources. Additionally, in some implementations, the supplemental information display module 1404 may display links to online sources of information in place of or in addition to the prestored content. Further, in some instances, the supplemental information display module 1404 may dynamically obtain information about a selected object from one or more online sources of information or other network accessible resources in response to the user selection of the object.

In some examples, the electronic device 100 may include a digital works library 1418, which may include one or more digital works, such as a digital work A 1420, a digital work B 1422, . . . , a digital work N 1424, and so forth. The electronic device 100 may also include a supplemental information library 1426, which may include supplemental information corresponding to the digital works in the digital work library 1418. In some implementations, a separate instance of supplemental information may be provided for each digital work 1420-1424. Accordingly, supplemental information A 1428 may correspond to the digital work A 1420, supplemental information B 1430 may correspond to the digital work B 1422, . . . , supplemental information N 1432 may correspond to the digital work N 1424, and so on. For example, the supplemental information A 1428 may have been received by the electronic device 100 in connection with the accessing or downloading of the digital work A 1420, such as from a digital work provider 1434. Thus, the digital work provider 1434 may provide digital works 1436 and corresponding supplemental information 1438 for each digital work 1436 to a plurality of electronic devices 100 of a plurality of users 1408.

Additionally, in some implementations, the digital work provider 1434 may provide the digital work and corresponding supplemental information to an intermediary, such as a wireless network provider (not shown) or the like, that, in turn, provides the digital work and corresponding supplemental information to particular electronic devices 100. For purposes of this disclosure, "providing" by the digital work provider may include any intermediaries that perform delivery of the digital works and/or supplemental information.

In addition, the digital work provider 1434 may provide updated supplemental information 1440 to the electronic device 100 on a one-time or periodic basis. For example, the supplemental information for one or more digital works stored on the electronic device 100 may include prestored content that provides information on one or more objects in the digital work. Such prestored content may be updated at the original source, and thus, the digital work provider may provide updated supplemental information 1440 to the electronic device 100 to reflect the change or update at the original source. Furthermore, other portions of the supplemental information may also change over time. For example, as new digital works are produced, objects in previous digital works may be discussed, used or referenced in the new digital works. Thus, in some examples, the supplemental information for existing digital works may be updated to include references to, or instances of, objects in newer digital works, such as for presenting the library view described above. Various other types of updates to the supplemental information may be provided by the digital work provider, with the foregoing being just several non-limiting examples. In addition, in some implementations, the supplemental information display module 1404 on the electronic device 100 may independently seek out and obtain updates to the supplemental information, such as from the digital work provider and/or other online sources.

To control the frequency of updates to the supplemental information, the digital work provider may apply one or more policies to determine whether changes to the prestored content, the reference identifiers, or other supplemental information are significant enough to warrant the distribution of updated supplemental content. For example, with respect to the prestored content, the digital work provider may determine whether the content has been changed by a predetermined threshold amount. The digital work provider may also consider other factors associated with the prestored content and the source of the prestored content, such as whether the source of the prestored content indicates that an error in the content has been corrected. Further, with respect to other types of updates to the supplemental information, various thresholds or policies may be similarly applied to determine whether to provide an update to the supplemental information for a particular digital work.

Figure 15:
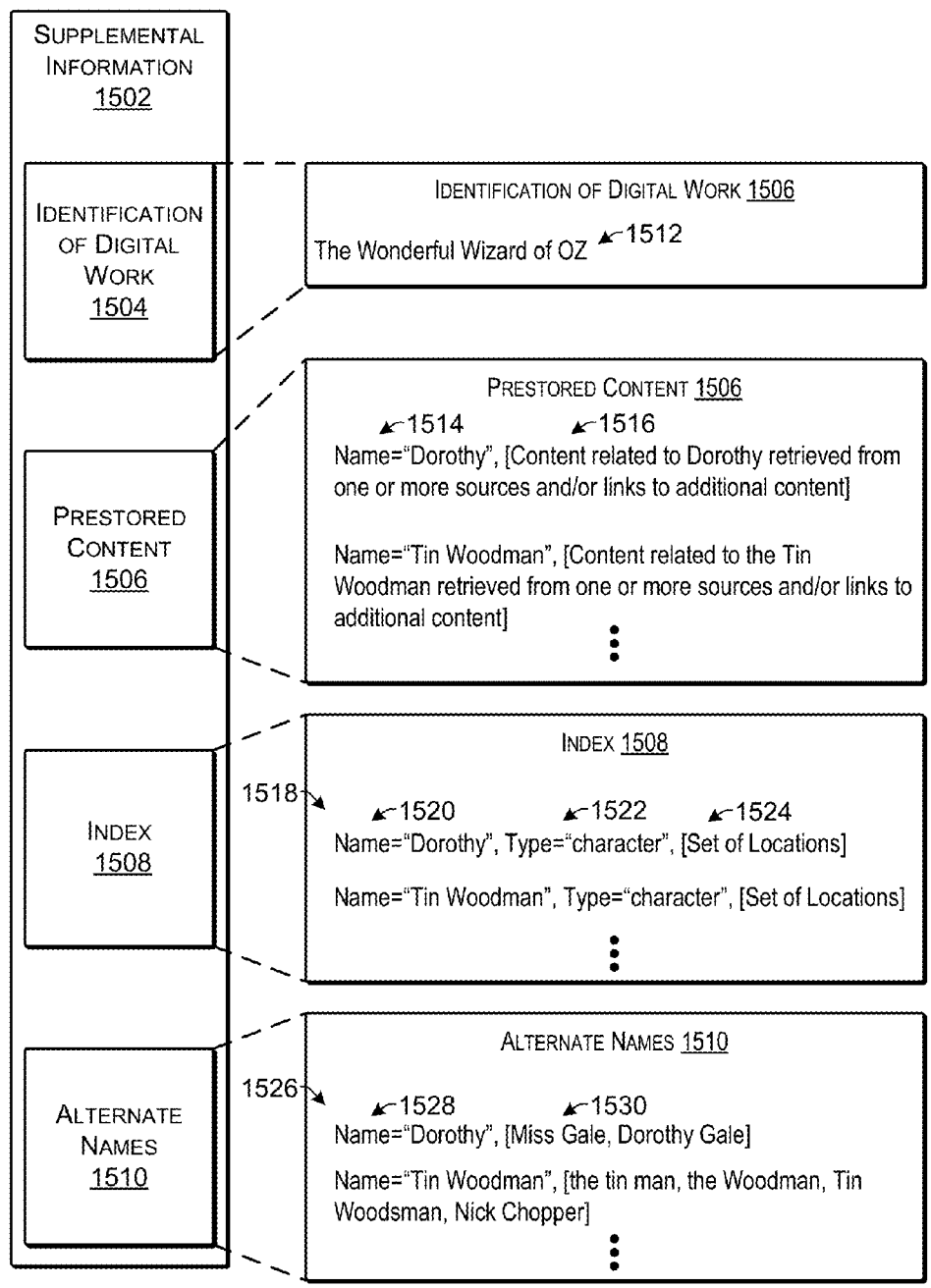
FIG. 15 illustrates an example structure of supplemental information for a digital work according to some implementations.

FIG. 15 illustrates an example data structure 1500 of an instance of supplemental information 1502 according to some implementations. In the example of FIG. 15, the supplemental information 1502 may include an identification of a digital work 1504, which may identify a digital work to which the instance of supplemental information 1502 corresponds. The supplemental information 1502 may also include prestored content 1506, an index 1508, and alternate names 1510. Referring back to the examples described above with reference to *The Wonderful Wizard of Oz*, the identification of the digital work 1504 may include the title 1512, and/or other identifier for the digital work to which the instance of supplemental information 1502 relates.

The prestored content 1506 may include various types of prestored content related to the objects identified in the digital work. For example, the prestored content may include a name 1514 of an object that the prestored content pertains to, and one or more instances of prestored content 1516, as well as links to network locations for accessing additional content. For example, links may be provided with the prestored content, such as for accessing a full article from which the prestored content was drawn or for accessing other articles or discussions of the object. Examples of prestored content may include excerpts from articles obtained from various authoritative online sources, as well as video clips, audio clips, digital images, and so forth. Examples of suitable sources of prestored content include Wikipedia®, Shelfari® and IMDb®, as well as other authoritative sources, such as dictionaries, encyclopedias, and the like. In some instances, the prestored content may include an audio clip that demonstrates proper pronunciation of an object, such as a character's name or other phrases or words in a digital work. As another example, when the digital work is an eBook, and there is a movie that corresponds to the eBook, one or more video clips or images from the movie may be provided as the prestored content. As one example, some of the video clips may correspond to particular scenes identified as objects in the supplemental information. As another example, some of the video clips may depict particular characters and these video clips may be included in the prestored content in association with names 1514 of the corresponding particular characters. Accordingly, a large variety of prestored content may be included with the supplemental information 1502, with the foregoing being just several non-limiting examples.

The index 1508 may include an identification of the objects in the corresponding digital work and occurrences or locations of the objects. In the illustrated example, the index 1508 includes a plurality of listings 1518 for a plurality of objects from the digital work. Each listing 1518 may include an object name 1520, an object type 1522, and one or more locations 1524 of the object in the digital work. In addition, in some implementations, the locations 1524 may also include locations of the named object in other digital works, such as other digital works in the library of digital works on the electronic device, or other digital works in the library of the digital work provider. As one example of a listing 1518, a name 1520 of a object is "Dorothy," a type 1522 of the object is "character," and the digital work may include a plurality of locations 1524 of the object, each instance of which is identified according to a location in the digital work. In some examples, the locations 1524 may each include a name of the digital work, a start location of the instance, and an end location of the instance, although other variations will be apparent to those of skill in the art in light of the disclosure herein.

The alternate names 1510 may include one or more listings 1526 of alternative names of characters, people, places, things, and so forth. For example, characters are often referred to by more than one name in a book or movie. Thus, to identify instances of a character in a book or movie, the alternate names of the character can also be identified. Accordingly, each alternate name listing 1526 may include a name 1528, and a set 1530 of one or more alternate names for the name 1528. The alternate names 1510 may enable index listings 1518 to be tied to one another to enable identification of occurrences in a digital work of a character that is known by multiple names. For example, during indexing, the locations of occurrences of alternate names of an object in a digital work may be added to the set of locations 1524 included in the index listing 1518 for an object. In other examples, when an object is selected, the alternate names 1510 may be referred to when producing the visual representation for the object and other supplemental information, and the index locations may be combined to produce the visual representation. The multiple alternate names may be associated with one another and an object using various automated techniques, such as by referring to various online sources of information regarding the digital work (e.g., Wikipedia®, Shelfari® and IMDb®) for the particular character, person or thing, and so forth. As another example, the digital work provider may maintain one or more files, one or more databases, or the like, that include a list, collection or compilation of known alternate names, such as known or common nicknames, character names, and so forth. Such a list, collection or compilation of alternate names may further include common variations of words or phrases, such as plural and singular versions of words or phrases, common synonyms, and so forth. The one or more files or databases of alternate names may be maintained locally by the digital work provider or may be stored at a location on a network.

Additionally, in some implementations, crowd sourcing may be used to assist in correcting errors in alternate names, locations of objects in a digital work, and other automated decisions. For example, users may be provided the opportunity to correct or augment the supplemental information. In some instances, the author of the digital work may also be provided the opportunity to provide information regarding alternate names and other information, such as selection of significant phrases, locations of occurrences of particular objects, identification of scenes, and the like, depending on the nature of the digital work.

Furthermore, in some instances, machine learning, classification, and/or statistical modeling may be used to correlate personal pronouns with particular characters, people, or other objects in a digital work. For example, pronouns that can be attributed to an object may be included as alternate names for the object. As another example, dialog and other actions or interactions may be attributed to particular character objects or people objects, and so forth, based on a location of a name or pronoun in relation to the dialog, action, etc. Thus, in the example of *The Autobiography of Benjamin Franklin* discussed above with reference to FIG. 13, the names Benjamin, Franklin, Ben, or Ben Franklin, etc., may be included as alternate names. Additionally, because the digital work is an autobiography, the use of the personal pronoun "I" in many instances in the text may also be identified as an alternate name for Benjamin Franklin. In this particular example, the use of the personal pronoun "I" in the text may be attributed to Benjamin Franklin except in situations in which "I" is used in dialogue attributable to another person other than Benjamin Franklin. Various automated techniques may be used to associate particular pronouns with particular objects in the text. For instance, statistical modeling, machine learning and/or other classification techniques may be applied to identify pronouns attributable to particular people, characters, or other objects. Numerous other variations will be apparent to those of skill in the art in light of the disclosure herein.

Example System Architecture

Figure 16:
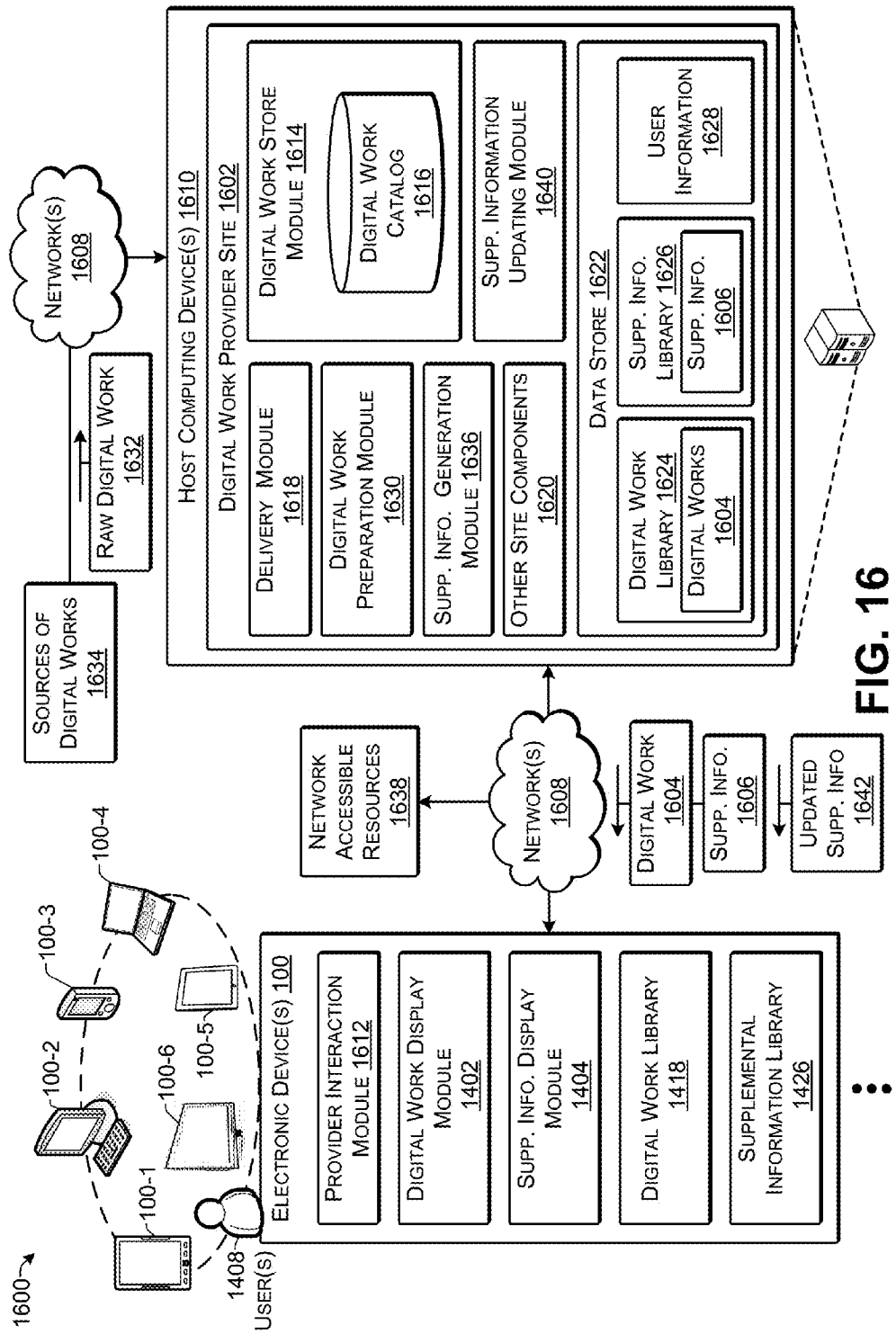
FIG. 16 illustrates an example architecture of a system for providing supplemental information for a digital work according to some implementations.

FIG. 16 illustrates an example architecture of a system 1600 including a digital work provider site 1602 for providing one or more digital works 1604 and corresponding supplemental information 1606 to one or more electronic devices 100 according to some implementations. As one non-limiting example, the digital work provider site 1602 may be a merchant website, an e-commerce site, or the like, that offers digital works to the public. In some implementations, the digital work provider site 1602 may offer digital works 1604, such as books, magazines, newspapers, songs, movies, and so forth, to the public through a website, other type of electronic commerce site, an online location, or the like. In some examples, the digital work provider site 1602 may alternatively, or additionally, provide digital works through an online or mobile application executing on the electronic device 100. For example, an application on the electronic device 100 may connect to or obtain content from the digital work provider site 1602 to enable the purchase or management of digital works, and the like. Thus, the digital work provider site 1602 may enable an electronic device 100 to access digital works 1604 through an online or mobile application executing on a mobile device, such as an eBook reader, smart phone, tablet computing device, or the like. Accordingly, the digital work provider site 1602 is not limited to a website accessed by a browser, but may encompass other technologies for obtaining digital works, such as through in-application shopping, and the like.

The digital work provider site 1602 is able to communicate with one or more electronic devices 100 and one or more users 1408 through one or more networks 1608. For example, the network(s) 1608 may include a local area network (LAN), a wide area network (WAN), such as the Internet, or any combination thereof, and may include both wired and wireless communication technologies using any suitable protocols and communication techniques. The digital work provider site 1602 and the electronic device 100 may communicate and interact with one another using any combination of suitable communication and networking protocols, such as Internet protocol (IP), transmission control protocol (TCP), hypertext transfer protocol (HTTP), and so forth.

In some implementations, the digital work provider site 1602 may be hosted on one or more host computing devices 1610. As one non-limiting example, the host computing device(s) 1610 may be one or more web servers located at a data center, server farm, or other single physical location. In other examples, the digital work provider site 1602 or portions thereof may be located in diverse locations that are physically remote from one another. Further, in some implementations, the digital work provider site 1602 may be a group of websites, data stores, services, and the like, hosted on a plurality of different host computing devices 1610 in a plurality of diverse locations, or hosted by one or more host computing devices 1610 at a single location.

Some non-limiting examples of electronic devices 100 may include digital media devices and eBook readers 100-1, desktop computing devices 100-2, smart phones and mobile devices 100-3, laptop and netbook computing devices 100-4, tablet computing devices 100-5, televisions, gaming systems and home electronic devices 100-6, and any other device capable of accessing and rendering online content. In the illustrated example, the electronic device 100 may include the digital work display module 1402, the supplemental information display module 1404, the digital work library 1418, and the supplemental information library 1426, as discussed above with reference to FIG. 14.

The electronic device 100 may further include a provider interaction module 1612, which in some instances may be an application, such as a web browser, mobile application, or other module or computer program configured to receive web content, webviews, online content, or the like, for accessing and interacting with the digital work provider site 1602. For example, the provider interaction module 1612 may enable the user 1408 to shop for digital works at the digital work provider site 1602 and access or receive digital works 1604 from the digital work provider site 1602, such as by downloading through the network(s) 1608. Further, in some implementations, the provider interaction module 1612 may enable the user 1408 to organize or manage the digital works on the electronic device 100, while in other implementations, a separate management module (not shown) may provide this functionality.

The digital work provider site 1602 may include a digital work store module 1614 that may provide or may access a digital work catalog 1616. For example, the digital work store module 1614 may present the digital work catalog 1616 to an electronic device 100 that accesses the digital work provider site 1602 to shop for a digital work 1604. The digital work catalog 1616 may include searchable and/or browsable listings and descriptions of digital works 1604 available from the digital work provider site 1602. The digital work store module 1614 may communicate with the provider interaction module 1612 on the electronic device 100 to enable the user 1408 to locate and acquire a digital work from the digital work provider site 1602.

The digital work provider site 1602 may further include a delivery module 1618 that may deliver a digital work to the electronic device 100 and/or the user 1408. For example, in some instances, the delivery module 1618 may facilitate the download of a digital work to the electronic device 100 over the network(s) 1608. In other instances, the delivery module 1618 may provide for delivery of a hard copy of the digital work to the user, such as by delivery of a recording medium that maintains a copy of the digital work, depending on the nature of the digital work and the electronic device 100.

Furthermore, in some implementations, the delivery module 1618 may refer to the user information 1628 to determine one or more digital works 1604 to download to the electronic device 100. For example, a user 1408 may have made purchased or otherwise accessed one or more digital works 1604 from the digital work provider site 1602 in the past. The user 1408 may acquire a new electronic device 100 and desire to have the previously purchased digital works 1604 accessible on the new electronic device 100. Consequently, the delivery module 1618 may deliver the previously purchased digital works 1604 to the new electronic device 100 and, contemporaneously, may also deliver the supplemental information 1606 corresponding to each of the digital works 1604 delivered to the new electronic device 100, such as before, during or after delivery of the previously purchased digital works 1604. For example, the user information 1628 may include account information, a purchase history, a user library, or other records of digital works of the user 1408, such as with respect to a first electronic device 100. Subsequently, when the user 1408 acquires a second electronic device 100, the delivery module 1618 may refer to the user information 1628 to determine, at least in part, digital works and related supplemental information to download to the second electronic device 100.

The digital work provider site 1602 may also include various other site components 1620, as is known, depending on the design and intended use of the digital work provider site 1602. For example, the other site components 1620 may include one or more pages of content, such as webpages, webviews, or other online content, that may be presented to the user 1408 through the provider interaction module 1612, such as during shopping for digital works from the digital work provider site 1602.

The digital work provider site 1602 may include or may access one or more data stores 1622 that include a digital work library 1624, a supplemental information library 1626, and user information 1628. For example, the digital work library 1624 may include a plurality of digital works 1604 that the digital work provider has available for access by the user 1408, such as by purchase through the digital works catalog 1616. The supplemental information library 1626 may include supplemental information 1606 for at least some of the digital works 1604 in the digital work library 1624. For example, the digital work provider site may generate the supplemental information 1606 for the digital works 1604 in the digital work library 1624 to provide the interfaces and information described above with reference to FIGS. 3-13. Further, the user information 1628 may include information for a plurality of users 1408 of the digital work provider site 1602. For example, the user information 1628 may include account information for each user for identifying and interacting with the user, such as name, email address, mailing address, telephone number, user identification (ID) number, user purchase history (e.g., digital works acquired by the user) so forth.

The digital work provider site 1602 may also include a digital work preparation module 1630 that may receive raw digital works 1632 from one or more sources of digital works 1634. For example, the sources of digital works 1634 may be publishers, authors, movie distributors, studios, music companies, artists, and so forth. In the case of textual digital works, the digital work preparation module 1630 may receive a raw digital work 1632 from the publisher, author, or other source of digital works 1634, and may parse and process the raw digital work 1632 to make the digital work compatible with various display formats, device platforms, and so forth. For example, the digital work preparation module 1630 may identify the start location and end location of pages, paragraphs, sentences, and other information in the digital work, and may produce metadata for the digital work that identifies the digital work and the properties of the digital work to enable rendering of the digital work on an electronic device 100.

The digital work provider site 1602 may further include a supplemental information generation module 1636, which may operate on the digital works 1604 in the digital works library 1624 to produce the supplemental information 1606. For example, the supplemental information generation module 1636 may select a particular digital work 1604 from the digital work library 1624 for generating supplemental information 1606 for the particular digital work 1604. The supplemental information generation module 1636 may parse and index the digital work by identifying characters, people, things, phrases, places and so forth that are of significance in the digital work. In some examples, the supplemental information generation module 1636 may access various authoritative sources of information, as well as performing statistical analysis and modeling to identify the significant objects in the particular digital work 1604. Thus, during the parsing, the supplemental information generation module 1636 may identify candidate objects that are candidates to make into objects for the digital work, such as by identifying proper names, place names, statistically improbable phrases, and the like, in the text of the digital work. For instance, a statistically improbable phrase is a word or combination of words that occur in the text of a digital work one or more times in a manner that is out of a predetermined threshold. For example, if a particular phrase is used multiple times in a digital work, while not being used or being used rarely in other digital works, this may be a statistically improbable phrase that is a candidate to become an object of the digital work.

To determine which candidate objects to make into objects, the supplemental information generation module 1636 may access other sources of information outside the digital work. For example, the supplemental information generation module 1636 may access network accessible resources 1638 that may include online sources of information, such as Wikipedia®, Shelfari® and IMDb®, online dictionaries, or other online resources, to determine identification of characters and other significant phrases, things, events or places in a digital work 1604. Further, the supplemental information generation module 1636 may obtain additional information on the statistically improbable phrases in the particular digital work 1604, such as by obtaining definitions or other information for these phrases from various locations, such as the authoritative sources mentioned above.

Following identification of the objects in the digital work, the supplemental information generation module 1636 may identify or obtain, where available, excerpts with respect to identified objects in the particular digital work from the authoritative sources. For example, the supplemental information generation module 1636 may obtain content on an object, such as an excerpt from a Wikipedia® article, a Shelfari® or IMDb® listing, or the like, to include with the supplemental information 1606 as prestored content for the objects identified in the particular digital work 1604. In other examples, the supplemental information generation module 1636 identifies the location of the content containing information about the object and includes a reference identifier to a network location of the content, rather than the content itself, with the with supplemental information.

The supplemental information 1606 generated for each digital work may be stored in the supplemental information library 1626. When the user 1408 acquires a particular digital work 1604, such as through interaction with the digital work store module 1614, the delivery module 1618 may deliver the particular digital work 1604 to the electronic device 100, and may also deliver the corresponding supplemental information 1606 for the particular digital work. For example, the particular digital work 1604 and the corresponding supplemental information 1606 may be downloaded contemporaneously from the digital work provider site 1602, e.g., as a package or as a sequential download.

Further, as mentioned above with respect to FIG. 14, updated supplemental information may also be provided for delivery to the electronic device 100 for the digital works stored on the electronic device 100, such as during one-time updates or at regular interval updates. The digital work provider site 1602 may include a supplemental information updating module 1640 that checks for updates to the supplemental information 1606. For example, the supplemental information updating module 1640 may check for updates to the digital work library 1624 that may necessitate updating a supplemental information index, such as to expand a library view of particular objects to include newly added digital works. Further, the supplemental information updating module 1640 may check for changes to prestored content in the supplemental information 1606 and/or may determine that links or network locations for new sources of information about objects in the supplemental information are available. For example, the supplemental information updating module 1640 may update the supplemental information 1606 for a digital work to include updated prestored content, new prestored content, or new or different reference identifiers to online sources of information about an object. Further, as mentioned above with reference to FIG. 14, the supplemental information updating module 1640 may apply one or more policies, thresholds, or the like, to determine whether the changes to the prestored content, reference identifiers, or other supplemental information are significant enough to warrant the distribution of updated content.

When supplemental information 1606 for a particular digital work 1604 is updated an amount significant enough to merit distribution of updated supplemental information, the supplemental information updating module 1640 may use user information 1628 to determine one or more electronic devices 100 that have an older version of the supplemental information. The supplemental information updating module 1640 may make updated supplemental information 1642 available for delivery to the one or more electronic devices 100 to update the supplemental information on those electronic devices 100. The delivery module 1618 may deliver the updated supplemental information 1642, or may provide the updated supplemental information 1642 to an intermediary that performs the delivery.

Example Electronic Device

Figure 17:
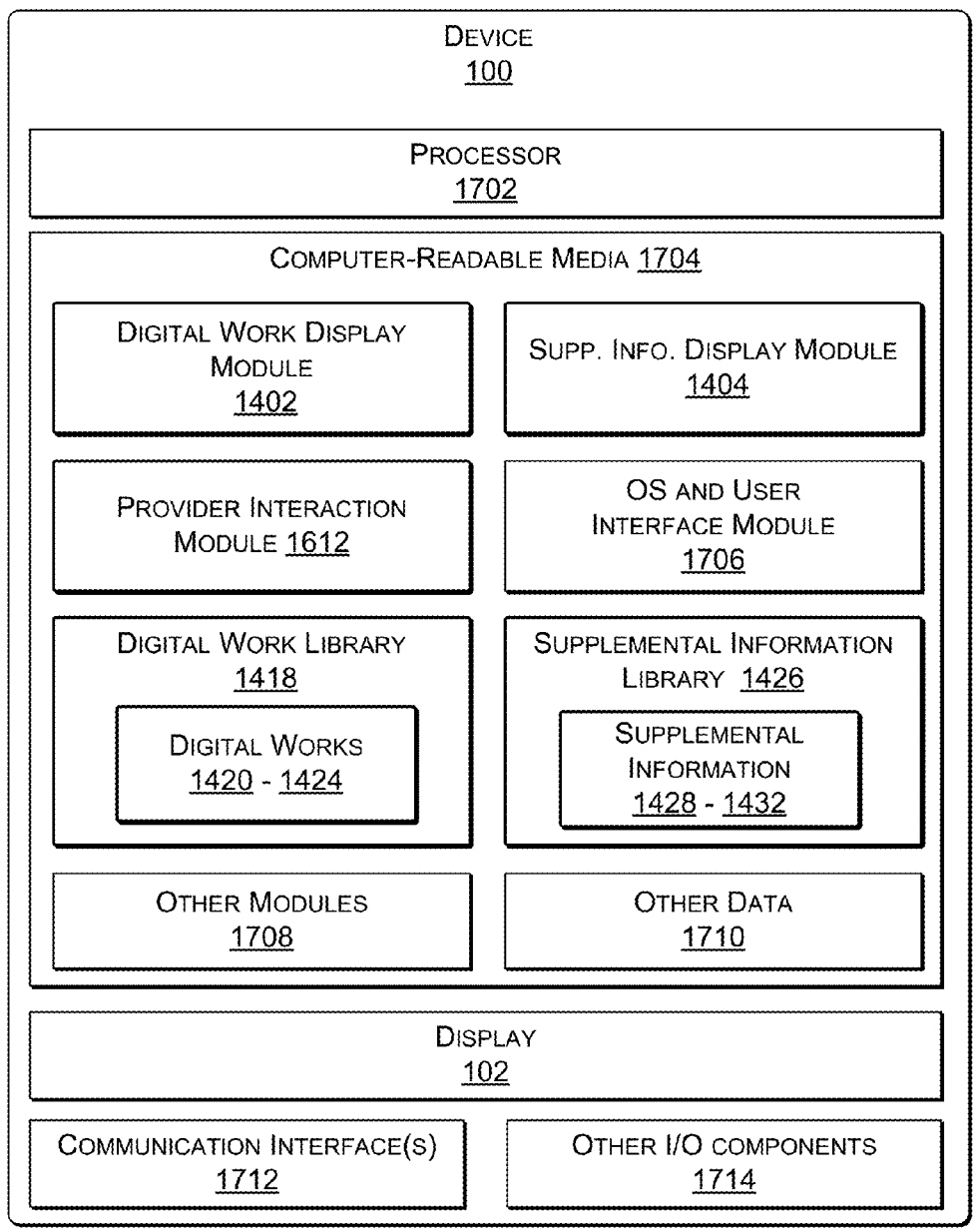
FIG. 17 illustrates select components of an example electronic device according to some implementations.

FIG. 17 illustrates select example components of the electronic device 100 that may be used to implement the functionality described above according to some implementations. In a very basic configuration, the electronic device 100 includes, or accesses, components such as at least one processor 1702 and a computer-readable media 1704. Each processor 1702 may itself comprise one or more processors or cores. Depending on the configuration of the electronic device 100, the computer-readable media 1704 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 1702 directly or through another computing device. Accordingly, the computer-readable media 1704 may be computer-readable media able to maintain instructions, modules or components executable by the processor 1702.

The computer-readable media 1704 may be used to store any number of functional components that are executable by the processor 1702. In some implementations, these functional components comprise instructions or programs that are executable by the processor 1702 and that, when executed, implement operational logic for performing the actions attributed above to the electronic device 100. Functional components of the electronic device 100 stored in the computer-readable media 1704 may include the digital work display module 1402 and the supplemental information display module 1404, as described above, which may be executed on the processor 1702 for displaying the digital works 1420-1424 and supplemental information 1428-1432 for the digital works 1420-1424, respectively. Additional functional components stored in the computer-readable media 1704 may include the provider interaction module 1612, executable by the processor 1702 for obtaining the digital works 1420-1424 and the corresponding supplemental information 1428-1432 from the digital work provider site 1602. Other functional components may include an operating system and user interface module 1706 for controlling and managing various functions of the electronic device 100. Depending on the type of the electronic device 100, the computer-readable media 1704 may also optionally include other functional components, such as other modules 1708, which may include applications, programs, drivers and so forth.

The computer-readable media 1704 may also store data, data structures, and the like that are used by the functional components. For example, data stored by the computer-readable media 1704 may include the digital work library 1418, containing the digital works 1420-1424, and the supplemental information library 1426, containing the supplemental information 1428-1432. The electronic device 100 may also include other data 1710, which may include, for example, data used by the provider interaction module 1612, the operating system and user interface 1706, and the other modules 1708. Further, the electronic device 100 may include many other logical, programmatic and physical components, of which those described are merely examples that are related to the discussion herein.

FIG. 17 further illustrates the display 102, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 102 may be an active display such as a liquid crystal display, plasma display, light emitting diode display, organic light emitting diode display, and so forth. These displays may comprise drive electronics, such as a display drive matrix configured to affect individual pixels within the display 102. Additionally, in some implementations, the display 102 may be a 3D display capable of providing a 3D image. For example, the display 102 may produce a 3D image by providing alternating left-eye and right-eye images with or without the use of shuttering or filtering eyeglasses. Accordingly, in some implementations, the visual representations and other user interface components herein may be rendered in 3D.

In some implementations, multiple displays 102 may be present on the electronic device 100. When multiple displays are present, these displays may be of the same or different types. For convenience only, the display 102 is shown in a generally rectangular configuration. However, it is understood that the display 102 may be implemented in any shape, and may have any ratio of height to width. Also, for stylistic or design purposes, the display 102 may be curved or otherwise non-linearly shaped. Furthermore, the display 102 may be flexible and configured to fold or roll.

One or more communication interfaces 1712 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 1712 may allow a user of the electronic device 100 to access the World Wide Web, download digital works and supplemental information from the digital work provider site 1602, access supplemental online content, such as a from a website or other network location, and the like. The communication interface 1712 may further allow a user to access storage on another device, such as a user's computing device, a network attached storage device, or the like.

The electronic device 100 may further be equipped with various other input/output (I/O) components 1714. Such I/O components may include a touchscreen and various user actuatable controls (e.g., buttons, a joystick, a keyboard, a mouse, etc.), speakers, a microphone, a camera, connection ports, and so forth. For example, the operating system 1706 of the electronic device 100 may include suitable drivers configured to accept input from a keypad, keyboard, or other user actuatable controls and devices included as the I/O components 1714. For instance, the user actuatable controls may include page turning buttons, navigational keys, a power on/off button, selection keys, and so on. Additionally, the electronic device 100 may include various other components that are not shown, examples of which include removable storage, a power source, such as a battery and power control unit, a global positioning system (GPS) device, a PC Card component, and so forth.

Example Computing Devices

Figure 18:
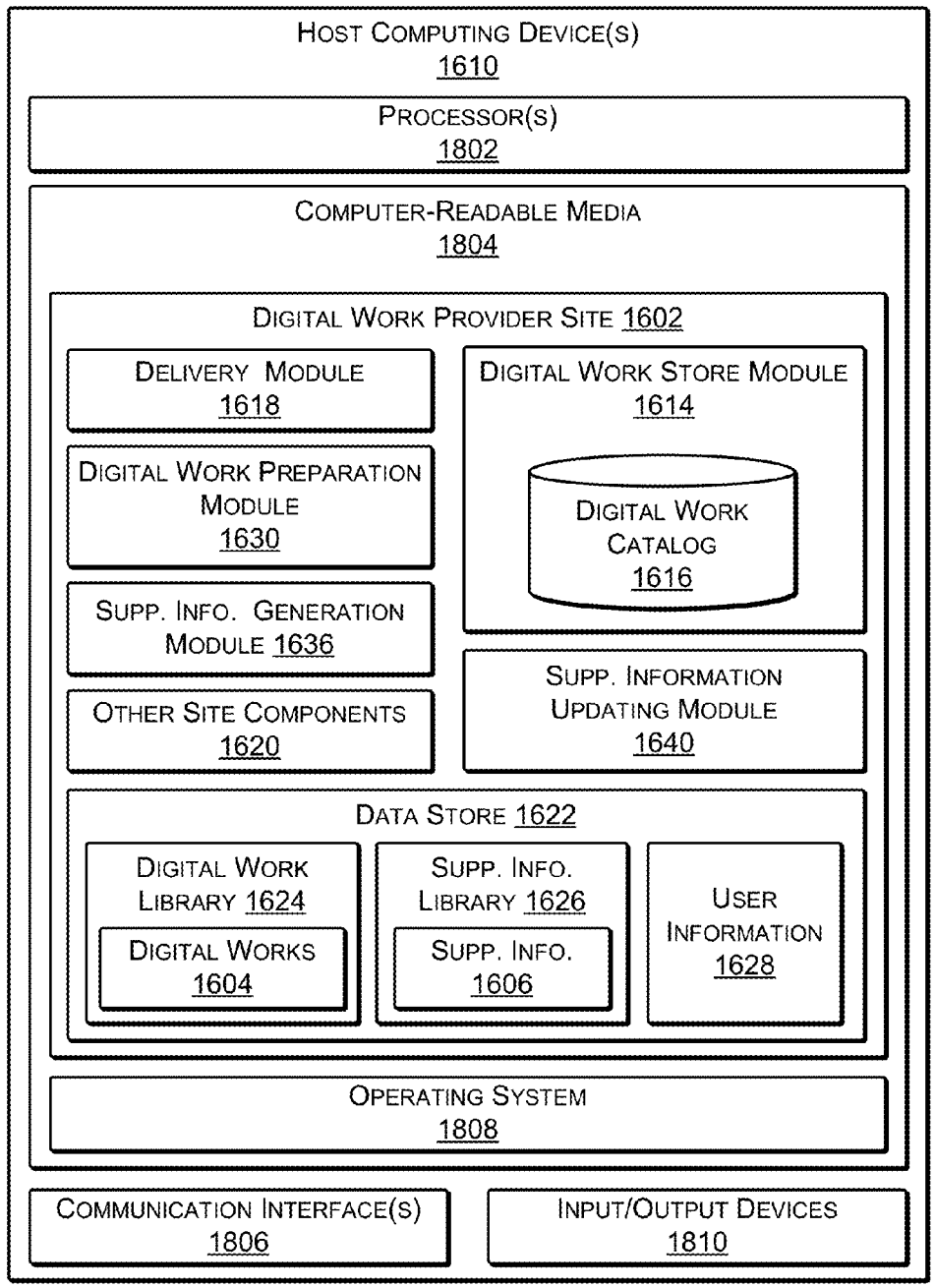
FIG. 18 illustrates select components of one or more example host computing devices of a digital work provider according to some implementations.

FIG. 18 illustrates select components of one or more host computing devices 1610 that may be used to implement the functionality of the digital work provider site 1602 according to some implementations. The digital work provider site 1602 may be hosted on one or more servers or other types of computing devices that may be embodied in any number of ways. For instance, in the case of a server, the digital work provider site 1602 may be implemented on a single server, a cluster of servers, a server farm or data center, a cloud hosted computing service, and so forth, although other computer architectures (e.g., a mainframe architecture) may also be used. Further, while the figures illustrate the components of the digital work provider site 1602 as being present in a single location, it is to be appreciated that these components may be distributed across different computing devices and locations in any manner. Generally, the digital work provider site 1602 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 18, an example host computing device 1610 includes one or more processors 1802, a computer-readable media 1804, and one or more communication interfaces 1806. The processor(s) 1802 may be a single processing unit or a number of processing units, and may include single or multiple computing units or multiple cores. The processor(s) 1802 can be configured to fetch and execute computer-readable instructions stored in the computer-readable media 1804 or other computer-readable media.

The computer-readable media 1804 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 1610, the computer-readable media 1804 may be a type of computer-readable storage media and may be a non-transitory storage media.

The computer-readable media 1804 may be used to store any number of functional components that are executable by the processors 1802. In many implementations, these functional components comprise instructions or programs that are executable by the processors 1802 and that, when executed, implement operational logic for performing the actions attributed above to the digital work provider site 1602. Functional components of the digital work provider site 1602 that may be executed on the processors 1802 for implementing the various functions and features related to providing digital works and supplemental information, as described herein, include the digital work store module 1614, the delivery module 1618, the digital work preparation module 1630, the supplemental information generation module 1636, and the supplemental information updating module 1640. Additional functional components stored in the computer-readable media 1804 may include the other site components 1620, and an operating system 1808 for controlling and managing various functions of the host computing device(s) 1610. In addition, the computer-readable media 1804 may include, or the host computing device(s) 1610 may access, the data store(s) 1622, which may include the digital work library 1624, including the digital works 1604, the supplemental information library 1626, including the supplemental information 1606, and the user information 1628. In addition, the computer-readable media 1804 may store or the host computing devices(s) 1610 may access the digital work catalog 1616 used by the digital work store module 1614. The host computing device(s) 1610 may also include many other logical, programmatic and physical components, of which those described above are merely examples that are related to the discussion herein.

The communication interface(s) 1806 may include one or more interfaces and hardware components for enabling communication with various other devices, such as the electronic devices 100, over the network(s) 1608. For example, communication interface(s) 1806 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 1608 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 1610 may further be equipped with various input/output devices 1810. Such I/O devices 1810 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

Figure 19:
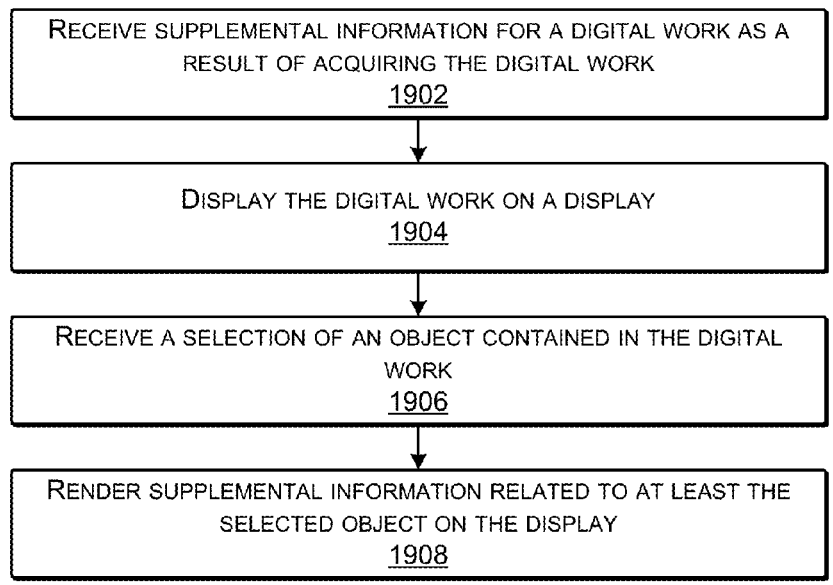
FIG. 19 is a flow diagram illustrating an example process executed by an electronic device for providing supplemental information in connection with a digital work according to some implementations.
Figure 20:
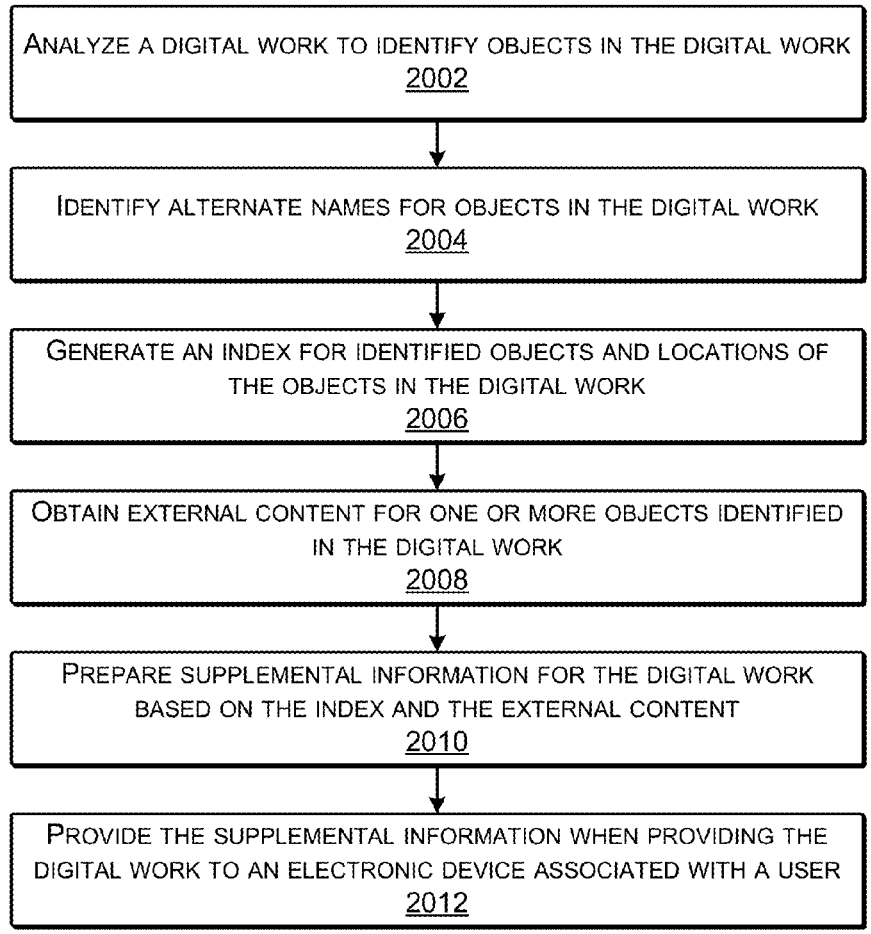
FIG. 20 is a flow diagram illustrating an example process executed by a digital work provider computing device for providing supplemental information in connection with a digital work according to some implementations.
Figure 21:
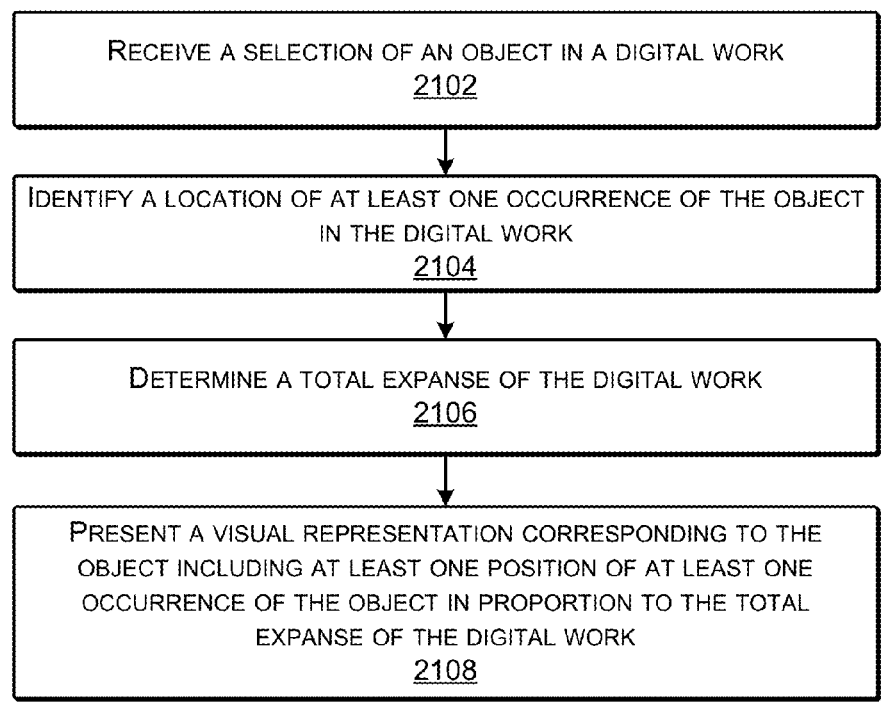
FIG. 21 is a flow diagram illustrating an example process for providing supplemental information that includes a visual representation corresponding to a selected object according to some implementations.

FIGS. 19-21 illustrate example processes for providing supplemental information in connection with a digital work, as described above. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

FIG. 19 is a flow diagram illustrating an example process 1900 that may be executed by the electronic device 100 for providing supplemental information according to some implementations herein.

At block 1902, the electronic device receives supplemental information corresponding to a digital work as a result of accessing or receiving the digital work. For example, when a user accesses and receives a particular digital work, such as by purchasing, licensing, or so forth, the supplemental information for the particular digital work may be provided to the electronic device along with the particular digital work, such as before, during, or after delivery of the particular digital work.

At block 1904, the electronic device displays the digital work on a display. For example, the user may use the electronic device to consume the digital work, such as by reading the digital work, playing the digital work, viewing the digital work, or the like.

At block 1906, the electronic device receives a selection of an object contained in the digital work. For example, a user may select an object displayed on the display of the digital work, such as by using a touch input, or other user input or input control to select the object.

At block 1908, the electronic device renders supplemental information related to at least the selected object on the display. For example, the electronic device may display supplemental information corresponding to the selected object. Furthermore, the electronic device may display supplemental information corresponding to other objects contained in the digital work, such as other objects contained on the same page as the selected object, same chapter as the selected object, or in the entire digital work.

FIG. 20 is a flow diagram illustrating an example process 2000 that may be executed by a digital work provider computing device, such as one or more of host computing devices 1610, for providing supplemental information according to some implementations.

At block 2002, the computing device analyzes a digital work to identify objects in the digital work. For example, the computing device may use statistical analysis techniques to identify proper names, place names, statistically improbably phrases, and so forth, in the digital work as candidate objects for being designated as objects. Additionally, in some examples, the computing device may refer to one or more external sources, such as network accessible resources, for assistance in identifying objects that may be of interest to a consumer of the digital work.

At block 2004, the computing device identifies alternate names for the objects identified in the digital work. For example, the computing device may determine nicknames, singular and plural variations, and so forth, for the objects to identify additional occurrences of the objects in the digital work. In some instances, the computing device may refer to external sources, such as network accessible resources, for assistance in identifying alternate names for the objects.

At block 2006, the computing device generates an index for the identified objects and includes in the index locations of the objects in the digital work. For example, the computing device may generate an index that includes a name of an object, a type of the object, and locations of one or more occurrences of the object in the digital work.

At block 2008, the computing device may obtain external content for one or more of the objects identified in the digital work. For example, the computing device may refer to one or more authoritative sources, such as by accessing one or more sources external to the digital work and/or network accessible resources available through a network such as the Internet. Examples of suitable network accessible resources may include Wikipedia®, Shelfari®, IMDb®, online dictionaries, encyclopedias, and the like.

At block 2010, the computing device prepares supplemental information for the digital work based on the index (including alternate names) and the external content. For example, the computing device may prepare an instance of supplemental information corresponding to the particular digital work. The instance of supplemental information may include the index generated for the digital work and the external content obtained for the objects identified in the digital work.

At block 2012, the computing device includes the supplemental information when providing the digital work to an electronic device. For example, a delivery module executing on the computing device may deliver the supplemental information to an electronic device that receives the digital work. Accordingly, the supplemental information may be provided to the electronic device contemporaneously with the digital work, such as before, during or after delivery of the digital work.

FIG. 21 is a flow diagram illustrating an example process 2100 that may be executed by the electronic device 100 for providing supplemental information that includes a visual representation according to some implementations.

At block 2102, the electronic device receives a selection of an object in a digital work. For example, a user may select an object from a displayed text of the digital work.

At block 2104, the electronic device identifies at least one occurrence of the object in the digital work. For example, the electronic device may refer to an index that includes a listing for the object to determine one or more locations of occurrences of the object in the digital work.

At block 2106, the electronic device determines a total expanse of the digital work. For example, the electronic device may determine a total number of pages in the digital work, a total number of assigned locations assigned to parts of the digital work, a total runtime of the digital work, or the like.

At block 2108, the electronic device presents a visual representation corresponding to the selected object, including at least one position of at least one occurrence of the selected object in proportion to the total expanse of the digital work. For example, the visual representation may include one or more markings that indicate locations and frequency of one or more occurrences of the object in proportion to a total size of the digital work, such as a total number of pages, total length, total playing time, or so forth. Accordingly, the visual representation may include any one of the example configurations of visual representations 418, 1102, 1104, 1106 and 1108 described above with respect to FIG. 11, and/or other possible variations of visual representations that represent a location of at least one occurrence of an object in relation to a total expanse of the digital work.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more non-transitory computer-readable media maintaining instructions executable by a processor of an electronic device to perform operations comprising:
  presenting text content of a page of a digital work on a display of the electronic device, the digital work including multiple pages of text content;
  receiving, by the electronic device, a selection of an object of text, wherein the selected object is representative of at least one of a character, a place, a thing, a phrase of interest, or an event included in the text content of the page of the digital work;
  presenting, on the display, a page view user interface that includes:
    a listing of objects of text, the listing including the selected object and one or more other objects included in the text content of the page with the selected object; and
    for at least one object in the listing of objects,
      a respective visual representation corresponding to the at least one object in the listing, the visual representation comprising at least one graphical marking indicating at least one location and a frequency of which an instance of the at least one object occurs in the digital work, the at least one graphical marking displayed in an area representative of a total length of the digital work.

2. The one or more non-transitory computer-readable media as recited in claim 1, the operations further comprising:
  receiving a user input for navigating to a supplemental information view user interface; and
  presenting the supplemental information view user interface on the display, wherein the supplemental information view user interface includes at least one of:
    at least one excerpt of text from the digital work, the at least one excerpt of text including an occurrence of the selected object; or
    content that includes information about the selected object, the content obtained from a source external to the digital work.

3. The one or more non-transitory computer-readable media as recited in claim 1, the operations further comprising:
  receiving a user input for navigating to another page of the digital work in the page view user interface; and
  presenting in the listing of objects in the page view user interface one or more objects that are included in the other page of the digital work.

4. The one or more non-transitory computer-readable media as recited in claim 1, the operations further comprising:
  receiving a user input for navigating to a chapter view user interface; and
  presenting the chapter view user interface on the display, wherein the chapter view user interface includes a listing of objects that are included in the chapter within which the object was selected.

5. The one or more non-transitory computer-readable media as recited in claim 1, the operations further comprising:
  receiving a user input for navigating to a book view user interface; and
  presenting the book view user interface on the display, wherein the book view user interface includes a listing of objects that are included in the digital work within which the object was selected.

6. The one or more non-transitory computer-readable media as recited in claim 1, the operations further comprising:
  prior to presenting the page view user interface, displaying a control on the display in response to the selection of the object; and
  receiving a user selection of the control to cause the presenting of the page view user interface.

7. The one or more non-transitory computer-readable media as recited in claim 1, wherein the at least one graphical marking comprises at least one of a line, a bar, a circle, or a color.

8. A method comprising:
  under control of one or more processors of a device specifically configured with executable instructions:
  presenting text content of a digital work on a display of the device, the digital work including multiple pages of text content;
  receiving, by the device, a selection of an object of text, wherein the selected object is representative of at least one of a character, a place, a thing, a phrase of interest, or an event included in the text content of the digital work;
  presenting, on the display, a user interface that includes a listing of objects of text from the digital work, the listing including the selected object, wherein at least one of the objects in the listing of objects occurs at multiple locations in the digital work; and
  presenting in the user interface a respective visual representation corresponding to each object listed in the listing of objects, the visual representation for each object listed providing at least one graphical marking indicating at least one location and a frequency of which an instance of the object listed occurs in the digital work.

9. The method as recited in claim 8, wherein the listing of objects includes multiple different objects from a single page of the digital work, the method further comprising:
presenting a line traversing the visual representations, the line representing a location of the single page with respect to the visual representations;
receiving a selection of a control to navigate to display of a listing of objects for a different page of the digital work; and
changing a location of the line with respect to the visual representations to reflect the location of the different page with respect to the visual representations.

10. The method as recited in claim 8, further comprising presenting a control for navigating between a page view, in which the listing of objects includes objects from a single page of the digital work, and a book view, in which the listing of objects includes objects from an entirety of the digital work.

11. The method as recited in claim 8, further comprising presenting a control for navigating between a page view, in which the listing of objects includes objects from a single page of the digital work, and a chapter view, in which the listing of objects includes objects from a single chapter of the digital work.

12. The method as recited in claim 8, further comprising presenting a control for navigating between a chapter view, in which the listing of objects includes objects from a single chapter of the digital work, and a book view, in which the listing of objects includes objects from an entirety of the digital work.

13. The method as recited in claim 8, further comprising presenting a control for navigating to a series view in which the listing of objects includes objects from a series of digital works including the digital work.

14. The method as recited in claim 8, further comprising presenting a control for navigating to a library view in which a listing of titles of a plurality of digital works are displayed, each digital work of the plurality of digital works listed in the listing including at least one occurrence of the selected object.

15. The method as recited in claim 14, wherein the library view further includes a respective visual representation corresponding to each listed digital work, the respective visual representation corresponding to each digital work indicating a location of the at least one occurrence of the selected object in the listed digital work.

16. The method as recited in claim 8, further comprising:
receiving a selection of one of the objects displayed in the listing of objects; and
displaying a supplemental information view, the supplemental information view providing at least one excerpt of text taken from the digital work, the at least one excerpt of text including an occurrence of the object selected from the listing.

17. The method as recited in claim 16, wherein displaying the supplemental information view further comprises displaying, with the at least one excerpt of text taken from the digital work, content related to the object selected from the listing, wherein the content is obtained from a source external to the digital work.

18. The method as recited in claim 17, wherein the content from the source external to the digital work includes at least one of:
text describing the object selected from the listing;
an image related to the object selected from the listing;
a video clip related to the object selected from the listing; or
an audio clip related to the object selected from the listing.

19. A device comprising:
a display;
one or more processors;
one or more computer-readable media; and
a module maintained on the one or more computer-readable media and executed on the one or more processors to perform operations that include:
receiving a selection of an object of text from among a plurality of objects of text identified in a digital work, wherein the selected object is identified as representative of at least one of a character, a place, a thing, a phrase of interest, or an event included in the digital work; and
presenting a user interface that includes:
excerpts of text taken from the digital work, each excerpt of text including an occurrence of the selected object, wherein at least one of the excerpts is presented based on an alternate name for the selected object; and
a visual representation for the selected object providing an indication of at least one position and a frequency of which an instance of the selected object occurs in the digital work, the visual representation including a first graphical marking corresponding to a first position associated with an occurrence of an instance of the selected object and a second graphical marking corresponding to a second position associated with an occurrence of another instance of the selected object, the first graphical marking and the second graphical marking being displayed in proportion to a total length of the digital work.

20. The device as recited in claim 19, wherein the user interface further comprises:
a slider presented with the visual representation to indicate a current location of the excerpts of text taken from the digital work, such that a size of the slider presented varies with respect to the visual representation depending on a distance between the excerpts of text currently displayed in comparison with the total length of the digital work.

21. The device as recited in claim 20, wherein movement of the slider with respect to the visual representation results in display of one or more different excerpts of text taken from the digital work corresponding to an area of coverage of the slider with respect to the graphical markings in the visual representation.

22. The device as recited in claim 19, further comprising presenting content related to the selected object in the user interface, wherein the content is obtained from a source external to the digital work.

23. The device as recited in claim 22, wherein the content from the source external to the digital work includes at least one of:
text describing the selected object;
an image related to the selected object;
a video clip related to the selected object; or
an audio clip related to the selected object.

24. The device as recited in claim 19, wherein:
the user interface is displayed in a window presented over a display of the digital work; and
closing the window results in display of the digital work.

25. One or more non-transitory computer-readable media maintaining instructions executable by a processor of an electronic device to perform operations comprising:

receiving a selection of an object of text from a digital work, wherein instances of the selected object occur at multiple locations in the digital work, wherein the selected object is representative of at least one of a character, a place, a thing, a phrase of interest, or an event included in the digital work;

presenting a first view in a user interface that includes:

a listing of objects of text that includes at least the selected object; and a visual representation displayed with the selected object in the listing, the visual representation providing a representation of graphical markings indicating locations of at least one occurrence and a frequency of which the instances of the selected object occur in the digital work in proportion to a total length of the digital work;

receiving a user input to navigate to a second view in the user interface; and presenting the second view in the user interface such that the listing includes at least one other object from the digital work not previously included in the listing and at least one other visual representation corresponding to the at least one other object in the listing.

26. The one or more non-transitory computer-readable media as recited in claim 25, wherein:

the first view is a first page view corresponding to a particular page of the digital work, and the user input is for navigating to a second page view in the user interface as the second view, corresponding to a different page of the digital work;

the listing in the first view of the user interface includes one or more objects, including the selected object, that are included on the particular page of the digital work; and the listing in the second view of the user interface includes one or more objects that are included on the different page of the digital work.

27. The one or more non-transitory computer-readable media as recited in claim 25, wherein:

the first view is a page view corresponding to a page of the digital work, and the user input is for navigating to a chapter view in the user interface as the second view, corresponding to a chapter of the digital work;

the listing in the first view of the user interface includes one or more objects, including the selected object, that are included on the page of the digital work, wherein the first view further includes a set of object buttons indicating types of objects present in the first view; and the listing in the second view of the user interface includes one or more objects that are included in the chapter within which the object was selected, wherein the second view further includes a different set of object buttons indicating types of objects present in the second view.

28. The one or more non-transitory computer-readable media as recited in claim 25, wherein:

the first view is a page view corresponding to a page of the digital work, and the user input is for navigating to a book view in the user interface as the second view, corresponding to an entirety of the digital work;

the listing in the first view of the user interface includes one or more objects, including the selected object, that are included on the page of the digital work; and the listing in the second view of the user interface includes the objects that are included in the entirety of the digital work.

29. The one or more non-transitory computer-readable media as recited in claim 25, wherein:

the first view is a book view corresponding to an entirety of the digital work, and the user input is for navigating to a series view in the user interface as the second view, corresponding to a series of digital works including the digital work;

the listing in the first view of the user interface includes the objects that are included in the entirety of the digital work; and the listing in the second view of the user interface includes the objects that are included in the series of digital works.

* * * * *